US005987423A

United States Patent [19]
Arnold et al.

[11] Patent Number: 5,987,423
[45] Date of Patent: Nov. 16, 1999

[54] OBJECT ORIENTED TECHNOLOGY FRAMEWORK FOR ORDER PROCESSING

[75] Inventors: Vincent Davis Arnold, Dodge Center, Minn.; Alf Christian Berg, Tarnasen, Norway; Kathryn Ann Bohrer, Austin, Tex.; Thomas Karl Athos Brane, Stockholm; Tore Magnus Dahl, Hässelby, both of Sweden; Tor Michaelson, Oslo, Norway; Anders Magnus Nilsson, Hagan, Norway; Helge Odegaard, Frogner, Norway; Torbjorn Harald Osten Pernbeck, Stockholm, Sweden

[73] Assignee: International Business Machines Corporation, Armonk, N.Y.

[21] Appl. No.: 08/828,934

[22] Filed: Mar. 28, 1997

[51] Int. Cl.⁶ .................................................. G06F 17/30
[52] U.S. Cl. ................................ 705/14; 705/8; 707/3; 707/103; 707/203; 395/682; 395/683
[58] Field of Search ...................... 705/14, 39, 8, 705/35, 30, 36; 707/103, 1, 3, 100, 203; 395/683, 682, 500, 673, 701–703, 705, 710, 677, 685, 200.33; 345/326, 335, 334, 340, 348, 356

[56] References Cited

U.S. PATENT DOCUMENTS

| | | | |
|---|---|---|---|
| 4,943,932 | 7/1990 | Lark et al. | 706/60 |
| 4,989,141 | 1/1991 | Lyons et al. | 705/36 |
| 5,057,996 | 10/1991 | Cutler et al. | 395/676 |
| 5,101,364 | 3/1992 | Davenport et al. | 345/328 |
| 5,119,475 | 6/1992 | Smith et al. | 345/353 |
| 5,181,162 | 1/1993 | Smith et al. | 707/530 |
| 5,189,608 | 2/1993 | Lyons et al. | 705/30 |
| 5,195,172 | 3/1993 | Elad et al. | 706/62 |
| 5,226,161 | 7/1993 | Khoyi et al. | 395/705 |
| 5,247,693 | 9/1993 | Bristol | 395/705 |
| 5,249,270 | 9/1993 | Stewart et al. | 395/200.52 |
| 5,257,384 | 10/1993 | Farrand et al. | 395/285 |
| 5,261,080 | 11/1993 | Khoyi et al. | 395/500 |
| 5,274,572 | 12/1993 | O'Neill et al. | 702/57 |
| 5,276,775 | 1/1994 | Meng | 706/51 |
| 5,287,447 | 2/1994 | Miller et al. | 345/32 |
| 5,293,470 | 3/1994 | Birch et al. | 707/514 |
| 5,297,283 | 3/1994 | Kelly, Jr. et al. | 707/103 |
| 5,315,703 | 5/1994 | Matheny et al. | 345/507 |
| 5,367,633 | 11/1994 | Matheny et al. | 345/507 |
| 5,369,766 | 11/1994 | Nakano et al. | 395/701 |
| 5,379,430 | 1/1995 | Nguyen | 707/3 |
| 5,388,264 | 2/1995 | Tobias, II et al. | 707/103 |
| 5,390,325 | 2/1995 | Miller | 395/183.14 |
| 5,396,626 | 3/1995 | Nguyen | 395/701 |
| 5,398,336 | 3/1995 | Tantry et al. | 707/103 |
| 5,615,109 | 3/1997 | Eder | 395/208 |
| 5,701,453 | 12/1997 | Maloney et al. | 395/602 |
| 5,748,960 | 5/1998 | Fischer | 395/683 |
| 5,758,153 | 5/1998 | Atsatt et al. | 395/614 |
| 5,778,378 | 7/1998 | Rubin | 707/103 |

OTHER PUBLICATIONS

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., "Persistent Framework Independent Record/Playback Framework", pp. 261–264.

(List continued on next page.)

*Primary Examiner*—James P. Trammell
*Assistant Examiner*—Cuong H. Nguyen
*Attorney, Agent, or Firm*—Martin & Associates, L.L.C.; Derek P. Martin

[57] ABSTRACT

An object oriented programming (OOP) framework includes an Order Management (OM) mechanism that tracks sales orders received and matches them to warehouse inventory, a Sales Order (SA) mechanism that processes sales orders, and a Purchase Order (PU) mechanism that processes purchase orders. The OM mechanism comprises a category of OOP classes that provide the primary interface between the framework classes and underlying business objects that provide accounting functions and warehouse management interfaces, and the SA and PU mechanisms comprise respective categories of OOP classes that keep track of sales orders received and purchase orders issued.

40 Claims, 29 Drawing Sheets

OTHER PUBLICATIONS

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formated Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Treaded Method Invocation".

Text of IBM Technical Disclosure Bulletin, vol 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract for WIPO Patent Application No WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994 "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. 9415285, Jul. 7, 1994, "Object–Oriented Notification Framework System", D.R. Anderson et al.

Abstract for U.S. Patent No. 5,119, 475, Schoen et al., Jun. 2, 1992, "Object–Oriented Framework for Menu Definition".

Abstract No. 95–091003/12, "Flexible Multi–Platform Partioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–To–End Simulation of A Surveillance System Employing Architecture Independence, Variable Fidelity Components and Software Resue".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D005, S. Vinoski, 1994, "Mapping COBRA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Qingzhong et al., 1992, "An Object–Oriented Model for Intelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029 from C. Le Pape, 1994, "Implementation of Resource Constraints in ILOG Schedule: A Library for the Development of Constraint–Based Scheduling Systems".

Inspec Abstract No. C9411–6115–035 from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodolgies of Object–Oriented Programs".

Inspec Abstract No. C9407–7420D–045, from Desai et al., 1994, "Controller Structure Definition Via Intelligent Process Control".

Inspec Abstract No. C9407–6140D–014, from Satoh et al., 1994, "Semantics for a Real–Time Object–Oriented Programming Language".

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interfaces Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modeling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186 from Righter et al., 1994, "An Object–Oriented Characterization of Spatial Ecosystem Information".

Inspec Abstract No. C9412–6160J–025 from J. Iivari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No.4664213, "Maintaining Information about Persistent Replicated Objects in a Distributed System"., 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J.D. Grimes, 1993, "Objects 101–An Implementation View", Proceedings of C++ World 1993.

Inspec Abstract No. 4647921, from Uhorchak et al., 1993, "An Object–Oriented Class Library for Creating Engineering Graphs Using PHIGS".

Inspec Abstract No. 464214, from, Marshall et al., 1992, "Using VDM Within an Object–Oriented Framework".

Inspec Abstract No. 4626386, from Arora et al., 1993, "Buiding Diverse Environments with PCTE Workbench".

Inspec Abstract No. 4622794, from Campbell et al., 1993, "A Technique for Documenting the Framework of an Object– Oriented System".

Inspec Abstract No. 4618974, from Bowers, 1993, "Some Principles for the Encapsulation of the Behaviour of Aggregate Objects".

Inspec Abstract No. 4616931, from Islam et al., 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rosazza, 1992, "An Object–Centered Fuzzy Representation".

Inspec Abstract No. 4565630, from Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The ecology of Class Refinement".

Inspec Abstract No. 4534334, from Campbell et al., 1991, "A Technique for Documenting the Framework of an Object– Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+ ".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al. 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluatin and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C9204–6110J–017, "Choices Frameworks and Refinement", R.H. Campbell et al., 1991.

Inspec Abstract No. 4090970, from P Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD environment".

Inspec Abstract No. 4050569, from Di Giovanni et al., 1990, "HOOD Nets".

Inspec Abstract No. C91072815, from Holtkamp et al., 1990, "DEMOM–A Description Based Media Object Data Model".

Inspec Abstract No. C91072016, from A. Lane, 1991, "/DOS/C++Application Frameworks".

Inspec Abstract No. C91072574, from Hemery et al., "An Analysis of Communciation and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment Into ET++A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented".

Inspec Abstract No. C91053475, from Queinnec et al., 1988, "An Open Eded Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Resuability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object–Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Elements Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Express Parallelism".

Inspec Abstract No C89014870, from R. King, 1988, "Semantic and Object–Oriented Database Support for Software Environments".

Inspec Abstract No. C89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga,, 1985, "PROMPTER: A Knowledge Based Support Tool for Code Understanding".

Inspec Abstract No C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

OBJECT ORIENTED TECHNOLOGY FRAMEWORK FOR ORDER PROCESSING

BACKGROUND OF THE INVENTION

1. Field of the Invention

This invention relates generally to data processing systems and, more particularly, to object oriented programming systems and processes.

2. Description of the Related Art

Computer programs have typically been developed using procedural programming techniques. Procedural programming techniques emphasize structuring the data processing procedures to which data values are subjected. Efforts to reduce long software development times and high software maintenance costs have resulted in structured programming techniques that attempt to reuse blocks of programming code. For example, tasks or processes that must be repeated can be written as system programming routines or program library functions. Program developers then provide an application program to accomplish a desired result using calls to the system routines and library functions.

System routines and library functions provide only a limited reduction in software development time-and maintenance costs. Once a procedural application program is written, it is relatively difficult to incorporate new features or additional data types. There are many processes in an application program that cannot be easily extracted from program code and reused. Additional data types often cannot be inserted into procedural program code without extensive rewriting of the original program code. Thus, even if new features in a program can be implemented using processes similar to those already in the application, the programming for such processes must be largely duplicated, with slight modifications, to provide the new features. This increases program development time. Moreover, if such programs must operate with other applications, it can be difficult to ensure that the changes will interface properly.

Another problem confronting program developers is that of providing program versions capable of operating with the various platforms used by customers. The different platforms encompass different operating systems as well as different companion applications with which the application must interface. With respect to operating systems, for example, a program developer might have to write different versions for satisfactory operation under the "Windows 95" operating system by Microsoft Corp., the UNIX system, the "MacIntosh" operating system by Apple Computer Corp., or the "OS/2" operating system by International Business Machines Corporation (IBM Corporation). In a similar fashion, a program developer might want to provide the ability to interface with application programs such as word processor programs, spreadsheet programs, and the like, meaning that the program developer must provide the ability to accept files (and produce files) in different file formats. Different platforms use different data formats and procedural operations, so program developers must provide different program versions or routines for each platform.

Object oriented programming (OOP) techniques encapsulate, or bind together, data and the methods that operate on them. This permits program development to more closely model real-world systems for problem solution and breaks up program development efforts into smaller, more manageable pieces. OOP programs are developed around object classes that have attributes, also called data values, and methods, also called functions. Although OOP techniques have done much to improve program development efficiency, such techniques still require a great degree of code generation on the part of application developers and limit program reuse among different classes.

OOP frameworks have been developed in an effort to further reduce program development costs. A framework is a set of OOP classes that embodies a predetermined set of attributes and methods for providing a common group of behaviors. An application program developer utilizes the framework and builds upon it, adding subclasses and attributes and modifying methods depending on the problem to be solved. Such changes to the framework are typically referred to as framework extensions, and are made possible by the OOP notions of inheritance and polymorphism. The challenge confronting framework developers, then, is to arrive at a set of classes and methods that will best provide the desired problem solution and will accept the most likely framework extensions. Thus, the designer of a framework must carefully assess what framework users will most likely need in the way of classes and attributes.

One area in which there is a great need for application program development is in the order processing domain. In particular, many businesses have computerized the functions of order processing. Applications exist, for example, that provide computer controlled order management of sales orders and purchase orders. Many company-specific features are needed for management of order reception, processing, warehouse functions, and tracking of products, all of which are continually changing, so that program development and software maintenance of applications for order processing are critical. Thus, a great deal of cost and effort are devoted to developing and maintaining application programs that perform order processing functions.

From the discussion above, it should be apparent that there is a need for an order processing application program development tool that permits application program developers to more quickly develop and more easily maintain order processing applications. The present invention fulfills this need.

SUMMARY OF THE INVENTION

In accordance with the present invention, a reusable object oriented (OO) framework for use with object oriented programming systems comprises an order processing shell that permits a framework adopter to use a set of order management objects that facilitate ordering of all types, a set of sales order processing objects that permit processing of sales orders, and a set of purchase order processing objects that permit processing of purchase orders, and to then add framework extensions for specific processing features, thereby producing an order processing application for all products that a company provides to customers. Such an order processing application manages order receiving, inventory control, shipping, and resupply. In this way, the order processing framework of the invention provides an OO base on which application program developers can build to add specific data types and processing features they deem important.

The framework includes classes for which it is anticipated extension subclassing with new attributes and methods will occur. An application program developer can customize the extension classes to meet the needs of application users and create all user interfaces with the application program, permitting the developer to more quickly complete program development and more easily perform software maintenance. The end-user interface establishes a means for the end-user to communicate with the application program to receive, process, and report data. The framework frees the program developer to concentrate on application program features, which can easily be implemented by extending the OO classes and methods of the OO framework. The framework thereby provides a base from which a variety of order processing systems can be quickly and efficiently produced.

The framework includes object oriented classes that specify object data attributes and methods. The framework adopter is free to incorporate extensions to the framework to provide a unique suite of functions and operations, resulting in the production of an application that is then utilized by an end user. For example, a single data object location can be provided for maintaining and accessing properties, business policies, and attributes that are defined for the suppliers and customers who are providing or receiving product. Using OOP principles, the framework adopter can add business or product attributes not present in the framework to support product types and other details desired by customers in a particular market niche. In this way, the framework adopter maximizes the exploitation of program commonality and the reuse of programming efforts, thereby reducing program development time and software maintenance costs.

Other features and advantages of the present invention should be apparent from the following description of the preferred embodiment, which illustrates, by way of example, the principles of the invention.

DESCRIPTION OF THE PREFERRED EMBODIMENT

1. Application Development

Figure 1:
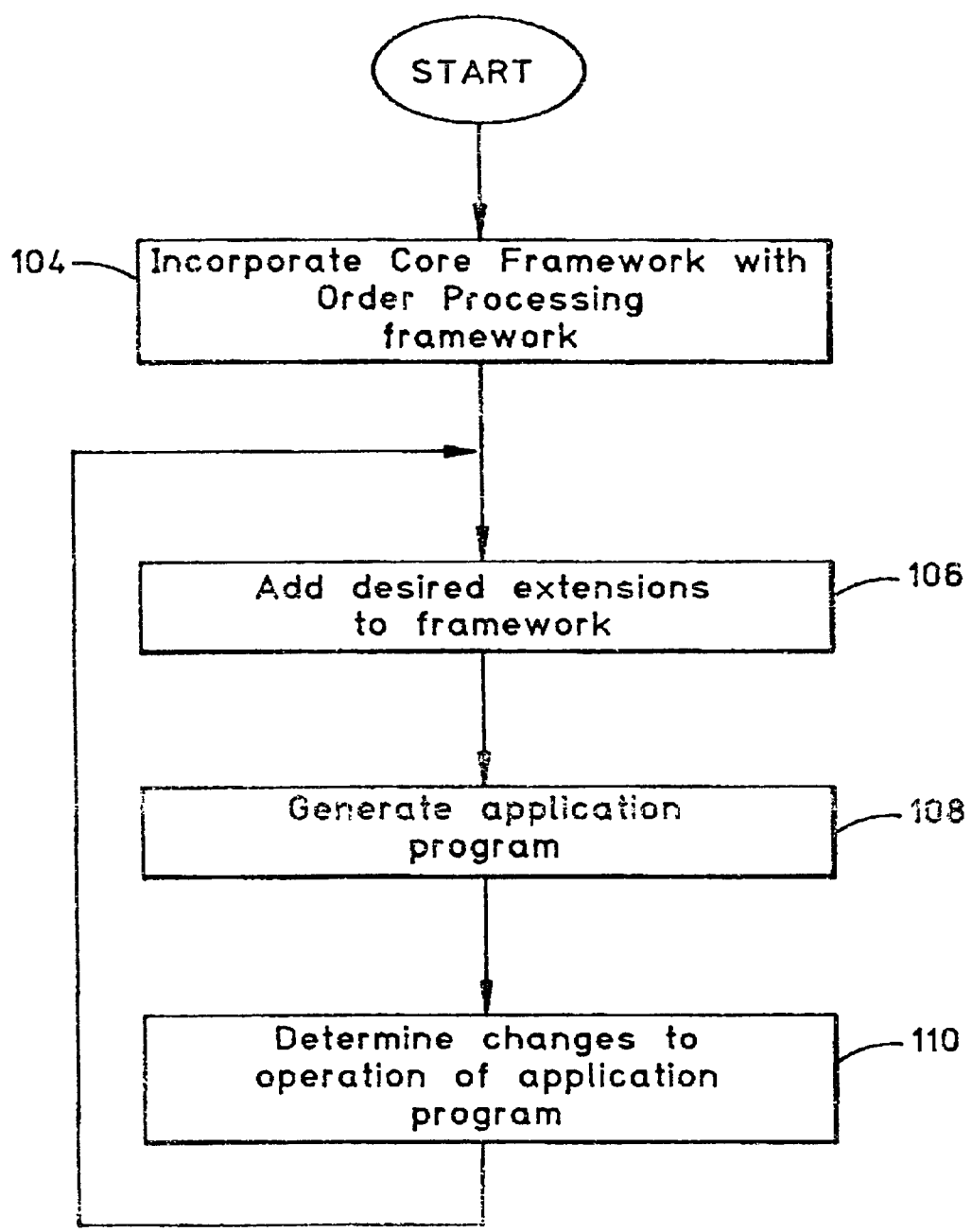
FIG. 1 is a flow diagram representation of the application development process that utilizes the framework of the invention to provide an order processing application program.

FIG. 1 is a flow diagram representation of the steps performed with a computer system to produce an order processing application program using the framework of the present invention. The order processing program of the preferred embodiment is designed to obtain certain information from objects of related core classes. Such information will include business and warehouse distribution network information concerning the company for which the order processing is to be performed, as well as other information needed to carry out operating in a computer system. These core classes can be organized into a core framework (CF) that is complementary to the framework of the present invention. The application program developer provides a user interface and combines operating interface features of the core object classes with the structure and functionality of the Order Processing OOP framework constructed in accordance with the present invention, and also adds particular framework extensions as needed, to generate an application program. The resulting application program can be used by application program clients, such as manufacturers and distributors, to carry out order processing functions and other tasks in the production and warehousing domain. In the following description, "framework" will refer to the framework illustrated in the drawing figures and "application" will refer to an application program that comprises an implementation of the extended framework, produced by an application developer who uses the framework.

In the FIG. 1 flow diagram, the first step is to incorporate the core framework with the Order Processing framework of the invention, as represented by the flow diagram box numbered 104. This step includes the incorporation of any object classes necessary for the system on which the application will run. For example, the preferred embodiment achieves operating platform independence and application program inter-operability by extending classes from the core framework (CF) set of base business classes. In this first step, the application developer will incorporate object classes necessary for achieving operating system independence and program inter-operability by extending and subclassing from the CF classes. In this way, the order processing application program can interface with multiple operating systems because only the CF extensions need change to accommodate new operating systems, while the order processing application can remain the same. In a similar way, companion application programs can more easily interface with the extended application program because the core, common set of CF classes will be known and will form a common interface.

The next step of application program development is to add desired extensions to the order processing framework, including the user interface. To implement this part of the program development process, the application developer-framework user must decide upon the particular extensions needed for the desired order processing operations and user interface, including any modifications or extensions to the class attributes and behaviors. The framework extensions are performed by a framework user in a manner dependent on the particular computer system on which the framework is received and manipulated. Such processing is represented in FIG. 1 by the flow diagram box numbered 106.

After the framework extensions are decided upon, the next step is to generate the application program. This step is represented by the flow diagram box numbered 108. The generation of an application program is generally referred to as program compilation. This step also will depend on the particular computer system on which the framework is used. Changes to the compiled program might be desired, both as part of the initial program debug and as part of revisions due to comments received from actual use. The process of determining such desired changes is represented by the flow diagram box numbered 110. When such changes are determined, they must be implemented into the program structure in the form of modified classes, attributes, and methods, which comprise further extensions to the framework. This is represented by the flow diagram path from the "determine changes" step at box 110 back to the "add desired extensions" step at box 106.

Thus, the design of the framework provides base classes on which application program developers can build to add specific features they deem important. With the core business classes, the framework classes can remain platform independent so that framework extensions are simplified. The application is easily modified without need for writing multiple versions of the program code because the revision of framework classes, attributes, and methods in accordance with the invention is platform independent. Easier development of new code, and seamless operation with applications using the same core classes, is ensured.

2. Operational Structure

Figure 2:
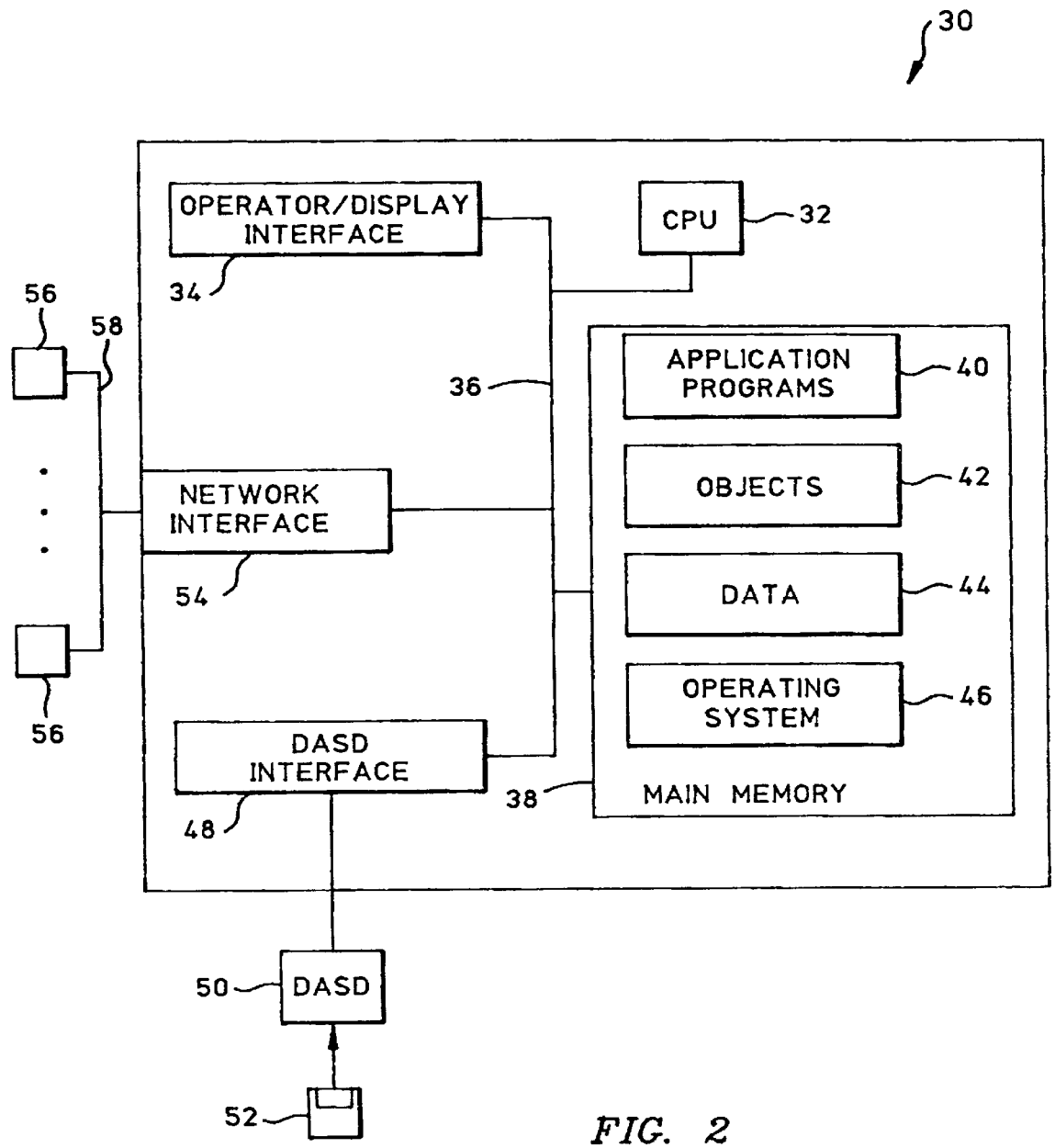
FIG. 2 is a block diagram of a computer system constructed in accordance with the invention.

FIG. 2 is a block diagram of a computer system 30 constructed in accordance with the present invention. The computer system is suitable for utilizing the framework of the invention to develop an application program, and for using the extended framework application program. The computer system 30 includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by wellknown methods that will be understood by those skilled in the art without further explanation.

3. System Modules

In the preferred embodiment of the invention, the object oriented framework includes system modules comprised of an: Order Management (OM) mechanism, which provides general structure and behavior required for all orders; a Sales Order (SA) mechanism, which processes sales orders; and a Purchase Order (PU) mechanism, which processes purchase orders. With such a framework structure, the OM mechanism is the primary interface between the framework classes and underlying business objects that might comprise, for example, accounting functions and warehouse management interfaces, and the SA and PU mechanisms are the primary interface to order processing applications that keep track of sales orders being received and purchase orders being issued.

The OM categories include an OM Order object category that contains attributes and methods that identify and process sales orders and purchase orders that are received and issued, including identification of customers, suppliers, products, and warehouse locations at which the products may be found. The OM Order category uses other categories to perform the order processing function, including: an OM Order Data Interchange for tracking orders based upon data received from external sources; and an OM Contract category for managing sales contracts and supply contracts for resupply of products and resources.

The SA categories include an SA Company category that identifies the company for whom the order processing is being performed, an SA Product Sales Information category for tracking product aspects that are unique to sales orders, such as pricing and discounts, customer data, and product sizes, colors, and units of measure, and an SA Sales Order category for tracking sales orders, including data concerning customer requests, product details, and order fulfillment. Accordingly, the SA Company, SA Product Sales Information, and SA Sales Order categories use the OM categories, as well as warehouse inventory categories that identify available inventory, to associate sales orders with quantities ordered, product availability, and warehouse shipment locations. Other SA categories include SA Sales Price and Discount, which tracks customer pricing, SA Sales Contract, which tracks ongoing contracts with customers, and SA Quotation, which maintains information about price and service quotations given customers. Other categories may provide additional features that improve the ability of the framework to accommodate user-defined data types and features, as desired.

The PU categories include a PU Company category that identifies the company for whom the order processing is being performed, a PU Purchase Product Information category for tracking product aspects that are unique to purchase orders, such as purchase discounts and purchase price groups, and a PU Purchase Order category for tracking purchase orders, including data concerning order confirmation from suppliers and back to back orders that involve immediate reshipment to customers of the company. Accordingly, the PU Purchase Product Information and PU Purchase Order categories use the OM categories and SA categories, as well as warehouse inventory categories that identify available inventory, to associate purchase orders with suppliers, deliveries, and warehouse receiving locations. Other PU categories include PU Supply Contract, which tracks supply contracts of the company, PU Purchase Price and Discount Requests, which tracks supplier pricing, and PU Back to Back Order Manager, which maintains information about back to back orders involving immediate reshipment of received products. Other categories may provide additional features that improve the ability of the framework to accommodate user-defined data types and features, as desired.

Figure 3:
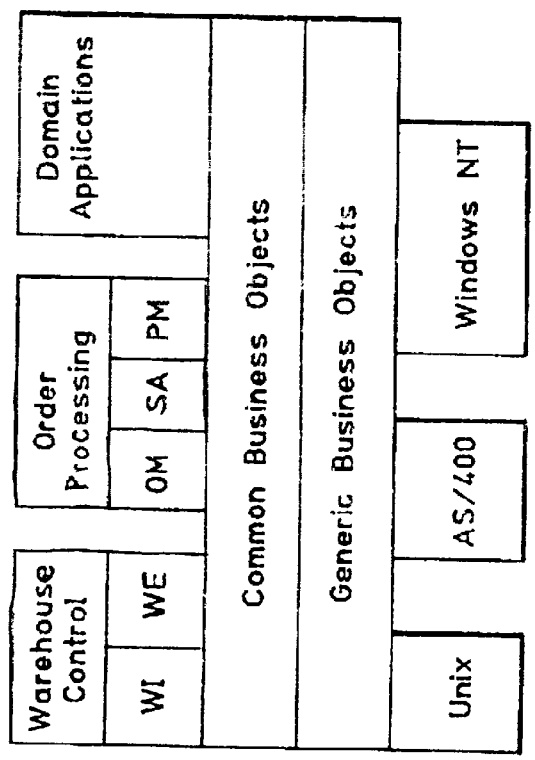
FIG. 3 is a representation of the framework that operates in the system of FIG. 2, showing the Order Management (OM), Sales Order (SA), and Purchase Order (PU) mechanisms that together comprise the Order Processing framework, and also showing a related Warehouse Control framework and common business objects utilized by the Order Processing framework.

FIG. 3 is a representation of the framework that operates in the system of FIG. 2, showing the Order Management (OM), Sales Order (SA), and Purchase Order (PU) mechanisms that together comprise the Order Processing framework system that is the subject of this description. The OM, SA, and PU mechanisms are shown attached to a Common Business Objects framework (CBOF) mechanism and a Generic Business Objects framework (GBOF) mechanism, which together comprise a core framework (CF) utilized by the framework of the invention. The CF provides common finctionality to permit communication between application mechanisms (such as Order Management) and different operating platforms, which are indicated in FIG. 3 by the modules indicated as "Unix", "AS/400", and "Windows NT" attached to CF.

Application program developers will add subelassing to the classes of which CBOF and GBOF are comprised. The classes of CBOF, for example, will include company identification classes that can serve as base classes for defining companies to multiple application programs. A CBOF "Company" class might contain general identifying company information, while the general ledger framework of the invention might extend from the CBOF and include "Company" classes that identify financial accounting parameters of the Company. Another application program, such as a manufacturing application, might include company classes that identify finished products of the Company. The GBOF classes are more directly related to the operating system and computer system side of the operating environment. That is, the GBOF classes are responsible for object persistence according to the operating system and object environment being supported, so that a General Ledger object that wants to maintain an object in persistent data storage must interface with GBOF classes. All application programs in related "business object" subject areas, or domains, should be able to make use of the common object classes specified by the CBOF and GBOF classes.

In FIG. 3, the mechanism called Order Processing (comprising Order Management, Sales Order, and Purchase Order) is shown attached to the CF (CBOF/GBOF) combination along with a Warehouse Control mechanism (application) and a module identified as "Domain Applications". All of these mechanisms are shown attached to the CF to indicate that other modules may be developed to communicate with the Order Processing framework. In this way, other domain applications may communicate with the Order Processing application and similarly interface with different operating platforms. It should be understood that the application mechanisms shown interfacing with the CF and interfacing with the alternative operating systems are exemplary only. That is, it is contemplated that additional domain applications may interface with the Order Processing mechanism, and it is contemplated that additional operating platforms may interface with the Order Processing.

The CF interface, however, does not form a part of the invention described herein. As noted above, those skilled in the art should be able to produce, without further explanation, a framework that provides the common functionality between operating systems and application domains that are provided by CF.

The OM, SA, and PU mechanisms of the order processing framework function in a computer system that includes order management categories, sales order categories, and purchase order categories. After a framework adopter has extended the framework so as to produce an order processing application, the end user of the application provides data and commands to the order processing application through the order management categories, receives sales order input through the sales order categories, and provides purchase order information through the purchase order categories.

The categories of the OM mechanism will be described next, followed by a description of the classes that comprise the OM categories. The categories of the SA mechanism will be described thereafter, followed by a description of the classes that comprise the SA categories, next the PU categories, and then the classes that comprise the PU categories. The processing of the extended framework will then be described, in accordance with accompanying flow diagrams of the processing.

4. OM Category Diagram

The framework categories provide a base of information and executable software that can be used by program developers and from which extensions can be developed. That is, the inventors of the present framework have identified a set of OOP classes most likely to be desired by developers of order processing application programs and have defined the relationships between such classes. Those skilled in the art will recognize that such classes can be overridden by users of the framework in that framework users who are developing applications can incorporate extensions and additions that suit the purposes of the user.

The categories of the Order Management portion of the framework will be referred to with a preceding "OM", the categories of the Sales Order portion of the framework will be referred to with a preceding "SA", and the categories of the Purchase Order portion of the framework will be referred to with a preceding "PU", unless not required by the context in which the category is being described.

The OM mechanism includes an OM Order category, an OM Order Data Interchange category, and an OM Contract category. In the preferred embodiment, these categories have relationships with categories from the related mechanisms or frameworks illustrated in FIG. 2, such as Picking, Reception, Sourcing, Targeting, Stock Control, and Transport Information categories from the Warehouse External (WE) mechanism and Quality Control and Product categories from the Warehouse Internal (WI) mechanism. The WE and WI mechanisms perform product stock, shipping, and transit functions. Exemplary mechanisms that perform these functions are described in the patent application entitled Object Oriented Technology Framework for Warehouse Control. The processing of these related categories and mechanisms will be described further below, as needed for understanding. For a more complete description of the WI and WE processing, reference should be made to the patent application entitled "Object Oriented Technology Framework for Warehouse Control", filed concurrently with this patent application and assigned to International Business Machines Corporation. Alternatively, those skilled in the art may develop their own warehouse interface and control programs that provide the same functions or may obtain such programs from other suppliers.

Figure 4:
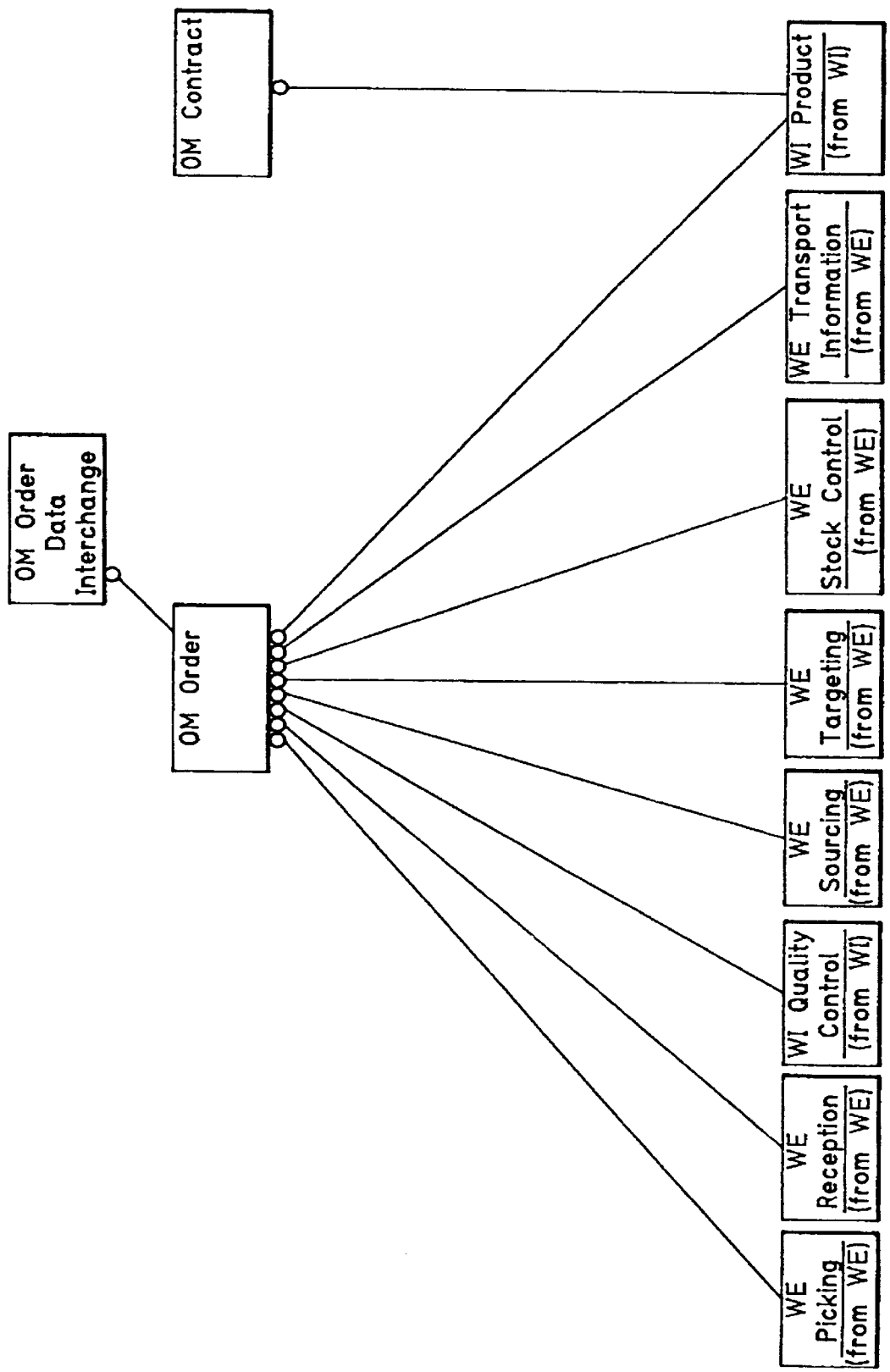
FIG. 4 is a category diagram representation of the OM mechanism illustrated in FIG. 3.

FIG. 4 is a category diagram for the OM mechanism of the framework implemented in the computer system of FIG. 2. Those skilled in the art will appreciate that the categories illustrated in FIG. 4 contain groups of OOP classes that encapsulate data attributes and behaviors, and are stored in the memory of the computer system. Such classes can be implemented, for example, in a computer system operating environment that supports the C++ programing language. It should be understood that a category as used in this description refers to describing the classes that make up the framework in terms of categories for purposes of easier explanation. The categories do not necessarily represent a structure that is reflected in any programming implementation of the framework. Those skilled in the art will appreciate that OO classes specify characteristics of the objects that will be instantiated at run time and will cooperate to perform the program functions.

5. OM Class Diagrams

There is no uniform standard in OO programming for describing OO classes, but this description will use the widely followed convention that class names comprise descriptive words whose initial letters are upper case. In the class diagrams, classes will be represented as class "clouds" with inter-class relationships indicated by connecting lines.

a. OM Order Category Diagram.

Figure 5:
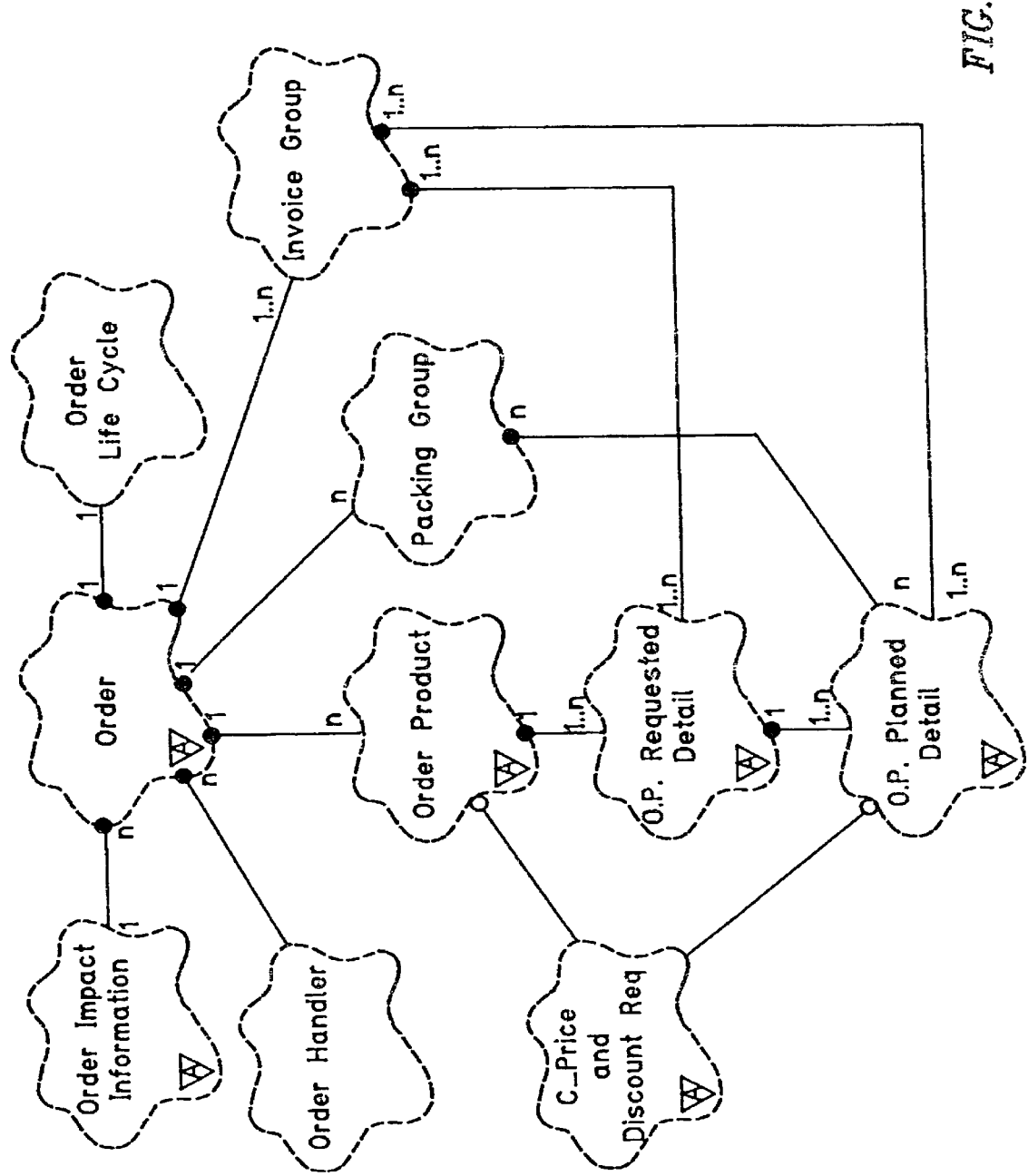
FIG. 5 is a class diagram of the OM Order category illustrated in FIG. 4, showing the Order class and related classes.

FIG. 5 is an object class diagram that illustrates the characteristics of the class called Order. Each use of the framework involves inheriting of the methods and attributes of abstract OM Order classes by a specific Order type (for example, Sales Order). The OM Order category provides a single location for defining the structure and behavior common to all types of orders, such as sales orders and purchase orders. Each of the specific order processes in the framework will reference, extend, and specialize the OM Order classes based on the unique requirements of the process. The OM Order category provides an overview chart that shows the overall structure of the abstract order model. All the details of the various classes are not necessary for understanding the framework operation; indeed, many of the details of the individual classes may be implemented in a variety of different ways without departing from the teachings of the invention.

FIG. 5 shows the OM Order category includes abstract base classes called Order, Order Product, Order Product Requested Detail, Order Product Planned Detail, and Order Impact Information. The category also includes an abstract base class that also is a control class, called Price and Discount Request. An abstract class represents a class that will be extended by the framework user to provide features specially selected by the framework user to add value to the resulting application program. Abstract classes will be designated in the drawings with an "A" enclosed in a triangle within a corresponding class cloud.

The Order class comprises the abstract base model for structure and behavior of the Order Processing system. The order model encompasses the entire order, for example, the business entity supplying or receiving the order, the Order Handler responsible for the order, and the like. The Order Product class comprises the abstract base model for structure and behavior of a single product being exchanged between business entities based upon the order. The Order Product Requested Detail class comprises the abstract model for the structure and behavior that describes the way the product was requested on the order. Thus, this class relates to such issues as packaging, delivery dates, and addresses. Finally, the Order Product Planned Detail class is the abstract model for the structure and behavior that describes the way in which the product was actually planned and delivered in response to the order. This class relates to such issues as product lots, serial numbers, and product substitutions.

b. OM Order Data Interchange Class.

Figure 6:
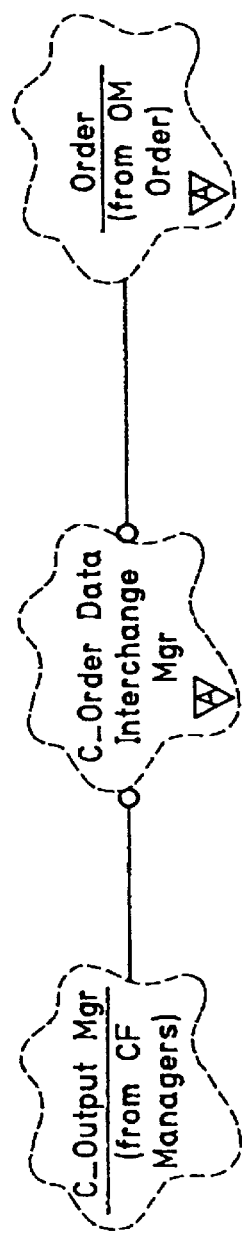
FIG. 6 is a class diagram of the OM Order Data Interchange category illustrated in FIG. 4, showing the Order Data Interchange Manager class and related classes.

FIG. 6 is a class diagram that illustrates the characteristics of the OM category called Order Data Interchange, illustrated in FIG. 4. The OM Order Data Interchange category provides the common structure for creating and maintaining orders based upon data received from external sources. FIG. 6 shows that this category includes a class called Order Data Interchange Manager, which is indicated as an abstract base class and as a control class. The Order Data Interchange Manager class provides the ability to preprocess orders from a variety of inputs as the first step in creating or updating orders. The class selects and normalizes input from various sources to the Order class in preparation for further processing.

FIG. 6 shows that the Order Data Interchange Manager class has a relationship with a control class called Output Manger, which is indicated as being part of the base business objects, and also has a relationship with the abstract base class called Order, which is indicated as being "from" the OM Order category and which was described above in connection with that category.

c. OM Contract Category.

Figure 7:
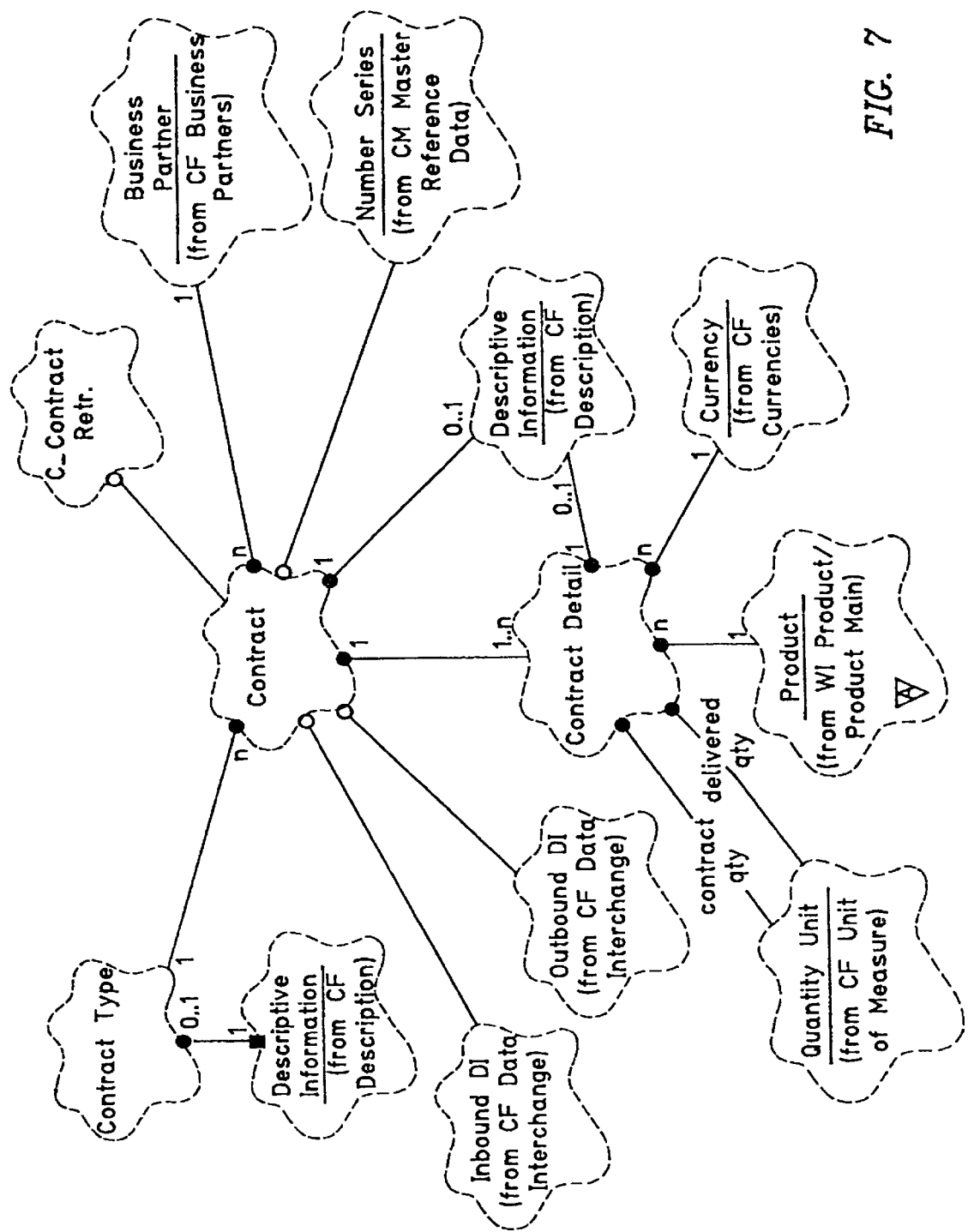
FIG. 7 is a category diagram of the OM Contract category illustrated in FIG. 4, showing the Contract class and related classes.

FIG. 7 is a class diagram that illustrates the characteristics of the OM Contract category that is the model used for creating, retrieving, and managing sales contracts and supply contracts. The OM Contract category includes classes called Contract, which contains information about agreements between the Company and a business partner for products or services, Contract Retriever, and Contract Detail. The Contract Retriever class decides which contract to use. Multiple contracts may apply to a single business partner of the Company.

The Contract class is responsible for the creation and maintenance of the contract and for the evaluation of performance against the contract. A Contract class member collects together a set of Contract Detail class members, who contain information about the details of the contract that are related to a specific product. The Contract class references a class called Contract Type, which identifies the Contract as a specific type of contract with respect to attributes such as price, discount, quantity, and the like, and references classes called Outbound Data Interchange, which is an extension point to provide contracts to external destinations and Inbound Data Interchange, which is an extension point to create or maintain contracts based upon inputs from external sources.

The Contract class also references a class called Descriptive Information, which holds free-form data (potentially in several languages with the capability to access by language) describing the contract, and references classes called Number Series, used to assign a unique identifier to a contract, and Business Partner, used to identify the second party to the contract.

The Contract Detail class references classes called Quantity Unit, Product, Currency, and Descriptive Information. The Product class has been described above. The Quantity Unit class defines the units in which the various quantities associated with the Contract Detail class are stated. This would include a quantity unit for the quantity contracted for and the quantity delivered. The Currency class contains the type of currency in which the monetary terms of the contract detail are stated. The Descriptive Information class contains free-form data describing the Contract Detail class.

6. SA Category Diagram

Figure 8:
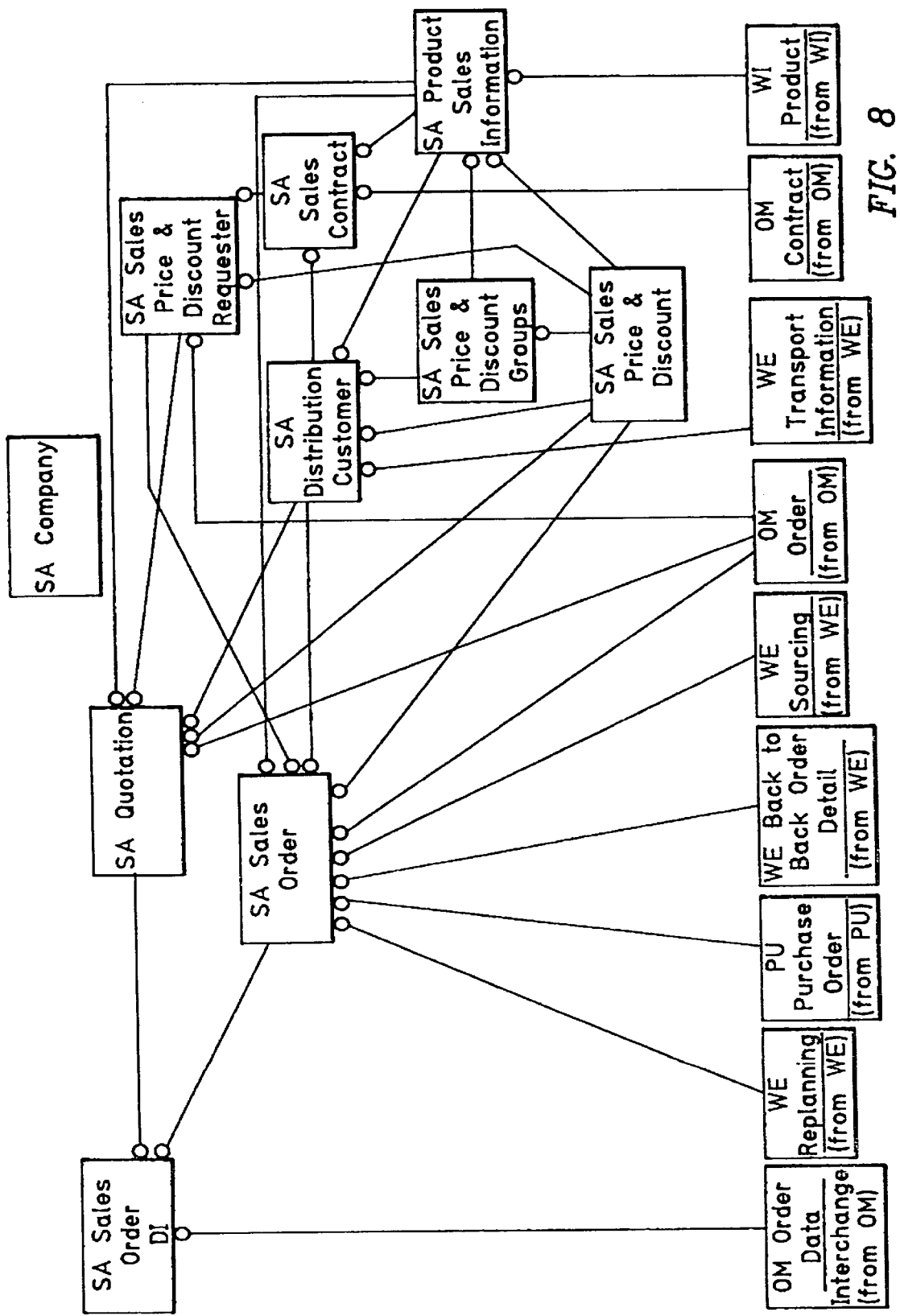
FIG. 8 is a category diagram representation of the SA mechanism illustrated in FIG. 3.

FIG. 8 is a category diagram representation of the SA mechanism. Those skilled in the art will appreciate that the categories illustrated in FIG. 8 correspond to OOP objects that encapsulate data attributes and behaviors, and are stored in the memory of the computer system. Such objects can be implemented, for example, in a computer system operating environment that supports the C++ programming language.

FIG. 8 shows that the SA mechanism includes a Company category, a Product Sales Information category, a Distribution Customer category, a Sales Order category, a Sales Order Data Interchange category, a Sales Price and Discount category, a Sales Price and Discount Groups category, a Sales Contract category, a Sales Price and Discount Requester category, and a Quotation category.

The SA Company category of classes contains information concerning properties, policies, and attributes of the company for whom order processing is to be performed. That is, the company that is the end user of the application program developed with this framework is identified by data contained in the SA Company category of classes. References to "Company" (initial letter capitalized) will be understood to refer to the end user company. The other SA categories will be described in greater detail, in turn, below.

In the preferred embodiment, the SA categories have relationships with categories from the related mechanisms or frameworks illustrated in FIG. 2, such as OM Order Data Interchange, OM Order, and OM Contract categories from the OM mechanism, Replanning, Back to Back Order Detail, Sourcing, and Transport Information categories from the Warehouse External (WE) mechanism and the Product category from the Warehouse Internal (WI) mechanism. As noted above, the WE and WI mechanisms perform product stock, shipping, and transit functions, and exemplary mechanisms that perform these functions are described in the concurrently filed patent application entitled "Object Oriented Technology Framework for Warehouse Control" assigned to IBM Corporation. The processing of these related categories and mechanisms will be described as needed for understanding. Alternatively, those skilled in the art may develop their own warehouse interface and control programs that provide the same functions or may obtain such programs from other suppliers.

a. SA Product Sales Information Category.

Figure 9:
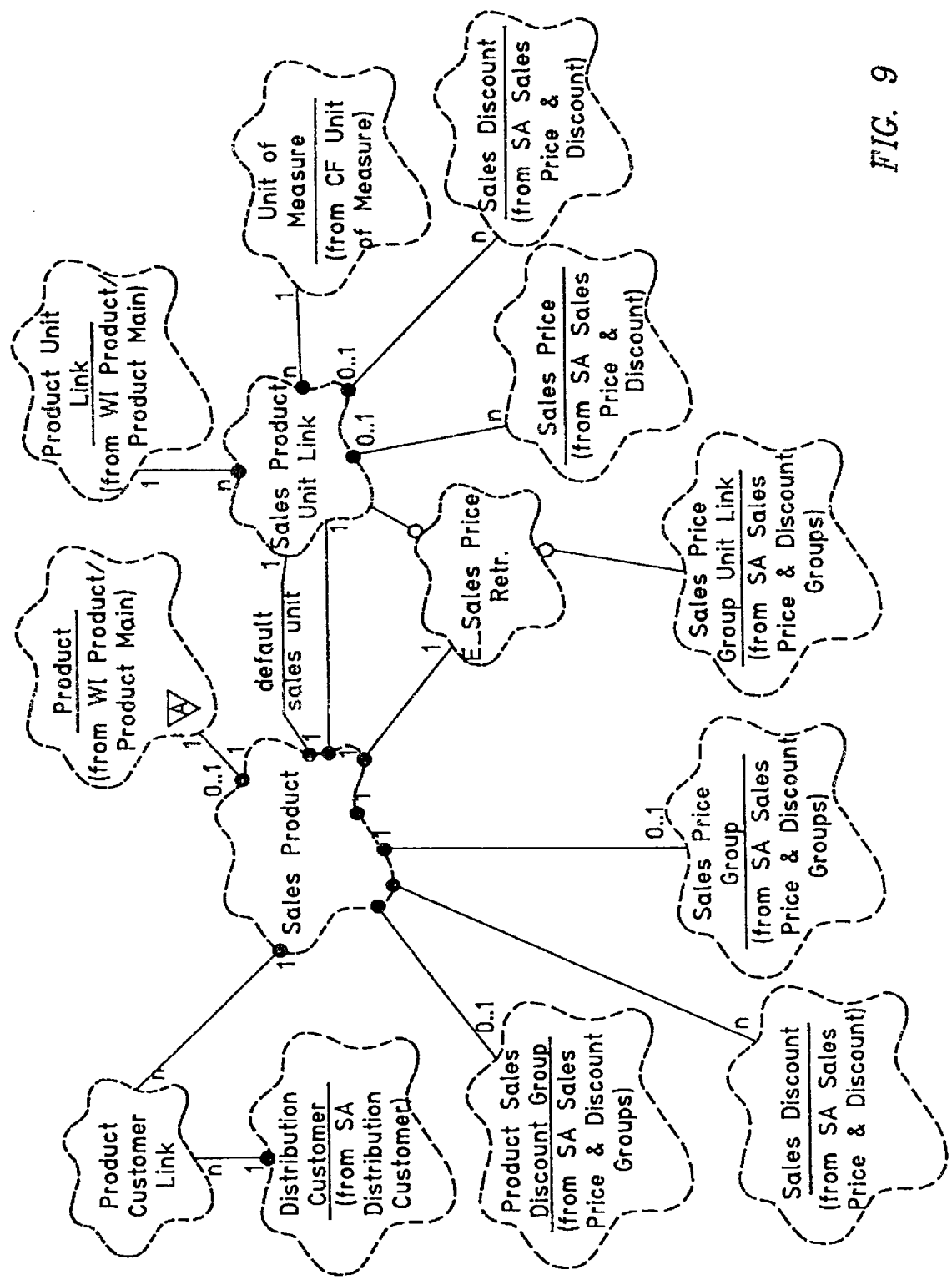
FIG. 9 is a class diagram of the SA Product Sales Information category illustrated in FIG. 8.

FIG. 9 is a class diagram that illustrates the characteristics of the SA Product Sales Information category that contains product aspects that are unique to sales orders. This category includes links to prices and discounts, customers, and units of measure. This primary class in this category is called Sales Product, which contains information about the Product that is only significant to selling the Product. This class also provides access to the more general capabilities of the Product in the Warehouse Internal mechanism, described in the co-pending application referenced above.

The Sales Product class references a Product Customer Link class, as does the Distributed Customer. This link class holds any information that is unique to a specific product being sold to a specific customer. For example, if some products could not be sold to all customers, then they would be controlled with this class.

The Sales Product class also references the Product Sales Discount Group class, which permits products to be organized into groups based upon the type of sales discount for which they are eligible. Also referenced is the Sales Discount class which defines the terms and applicability for each of the discounts available for the Sales Product, and Sales Price Group, which permits the Sales Product to be associated with a Price Group that defines the sale prices for all products in the group. The Sales Products class also references the Sales Product Unit Link class, which identifies the units in which a product can be sold and holds any attributes related to selling the product in a specific unit of measure, including any sales prices and discounts that apply for a specific unit. This class also references the Product Unit Link class to access information about the units authorized for the product. The Sales Price Retriever class also is referenced by the Sales Product. This class is an extension class where the framework user/application developer can implement business rules to control the retrieval of sales prices for the product and select among price alternatives. This class in turn references the Sales Product Unit Link class to find the units in which the Product can be sold and to find unit specific prices and discounts, and also references the Sales Price Group Unit Link class to identify any Sales Price Groups that apply if the Product is sold in a specific unit of measure.

b. SA Distribution Customer Category.

Figure 10:
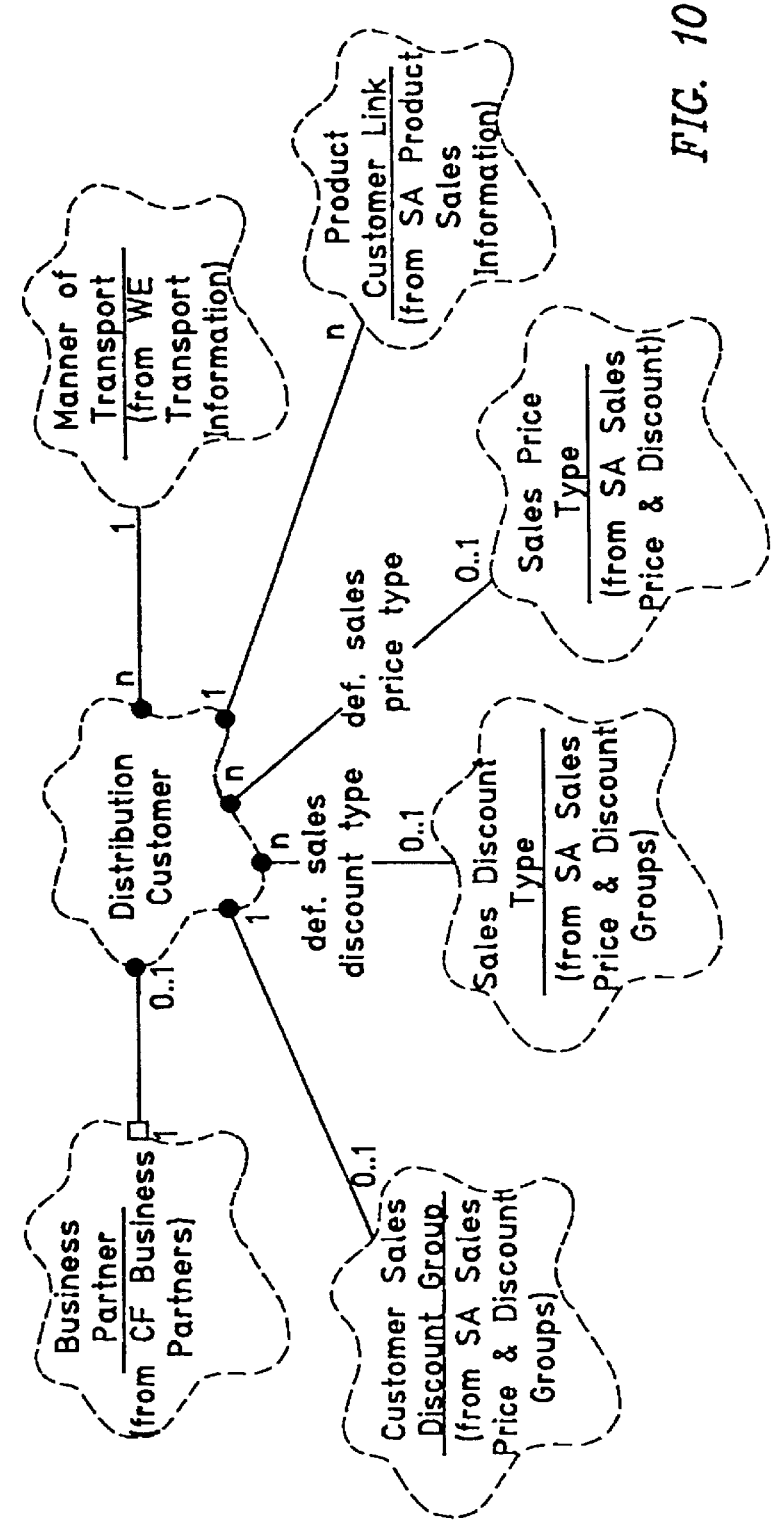
FIG. 10 is a class diagram of the SA Distribution Customer category illustrated in FIG. 8, showing the Distribution Customer class and related classes.

FIG. 10 is a class diagram that illustrates the characteristics of the SA Distribution Customer category that contains customer aspects unique to sales orders. This category includes the Distribution Customer class, which contains information about the Business Partner that is unique to the customer relationship and provides access to the more general capabilities of the Business Partner class, if required.

The Distribution Customer class references the Customer Sales Discount Group class, which permits customers to be organized into groups based upon the type of sales discounts they qualify for, the Sales Discount Type class, a class that identifies the type of sales discount that is the default for the customer, and the Sales Price Type class, the class that identifies the type of sales price that is the default value for the customer. The Distribution Customer class also references the Product Customer Link class, a link class that holds any information unique to a specific product being sold to a specific customer. This link class provides access to information about products purchased by the customer. Finally, the Distribution Customer class references the Manner of Transport class, which defines the default transportation method used to deliver products to the customer.

c. SA Sales Order Category.

Figure 11:
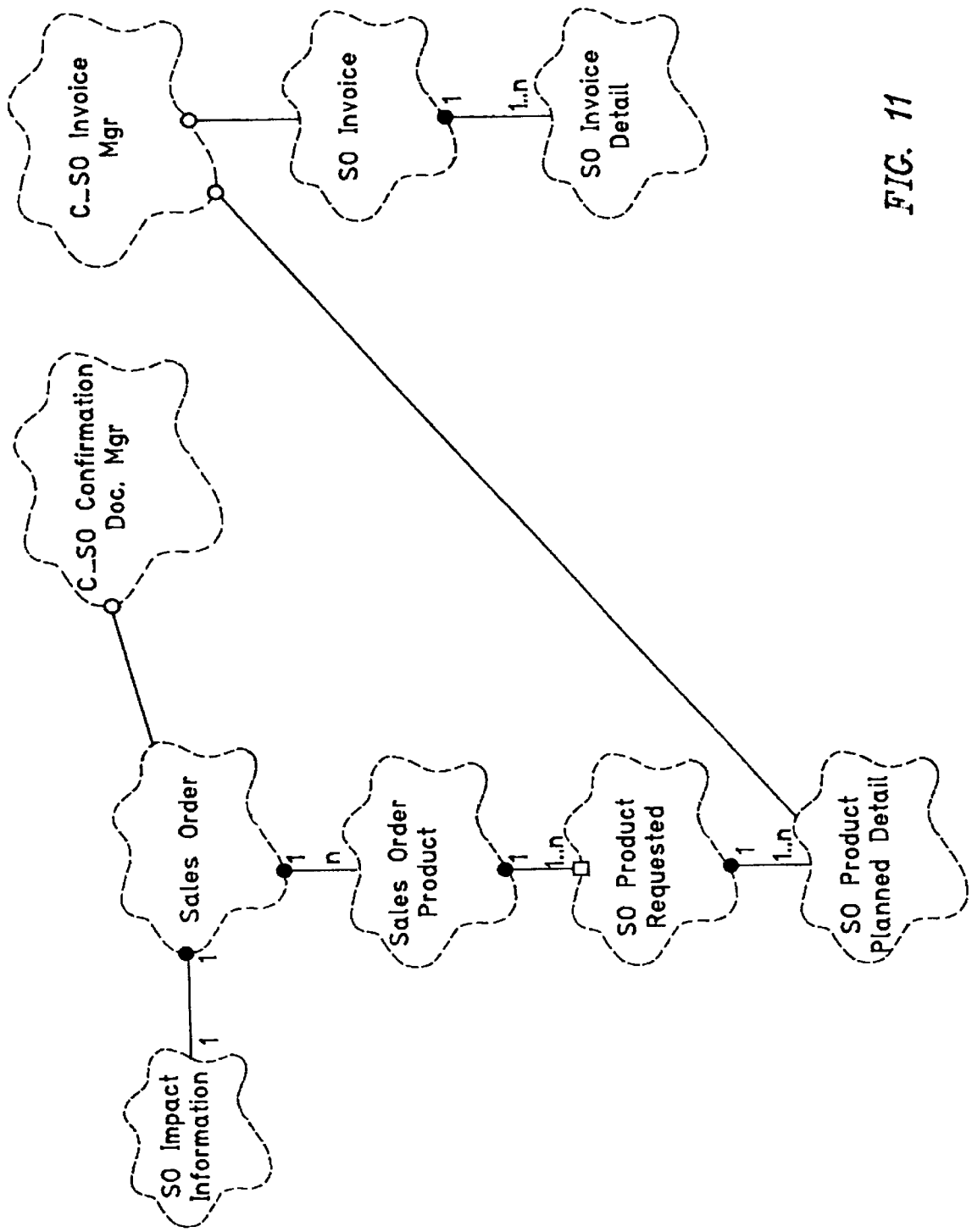
FIG. 11 is a class diagram of the SA Sales Order category illustrated in FIG. 8 showing the Sales Order class and related classes.

FIG. 11 is a class diagram that illustrates the characteristics of the SA Sales Order category that creates and maintains the overall sales order and order product detail describing customer requests and the fulfillment of such requests throughout the order life cycle. This category also confirms orders and creates and maintains sales order invoices, references Order Management for structure and behavior common to many types of orders, and inherits much of its structure and behavior from the Order category of the Order Management category. The SA Sales Order category shows the primary classes to include Sales Order Confirmation Document Manager, which creates the Sales Order Confirmation that is sent to a customer to confirm how the order was placed, and the Sales Order class, whose structure and behavior relate to the entire sales order. Other primary class include Sales Order Product, having a structure and behavior for one product being sold on one sales order, the Sales Order Product Requested class, having a structure and behavior related to the way in which a customer requests the Sales Order Product from the Company, the Sales Order Planned Detail, having a structure and behavior related to the manner in which the Company has fulfilled or plans to fulfill a Sales Order, and the sales order invoice manager, which creates the invoice which is sent to the customer to request payment for these.

d. SA Sales Order Data Interchange Category.

Figure 12:
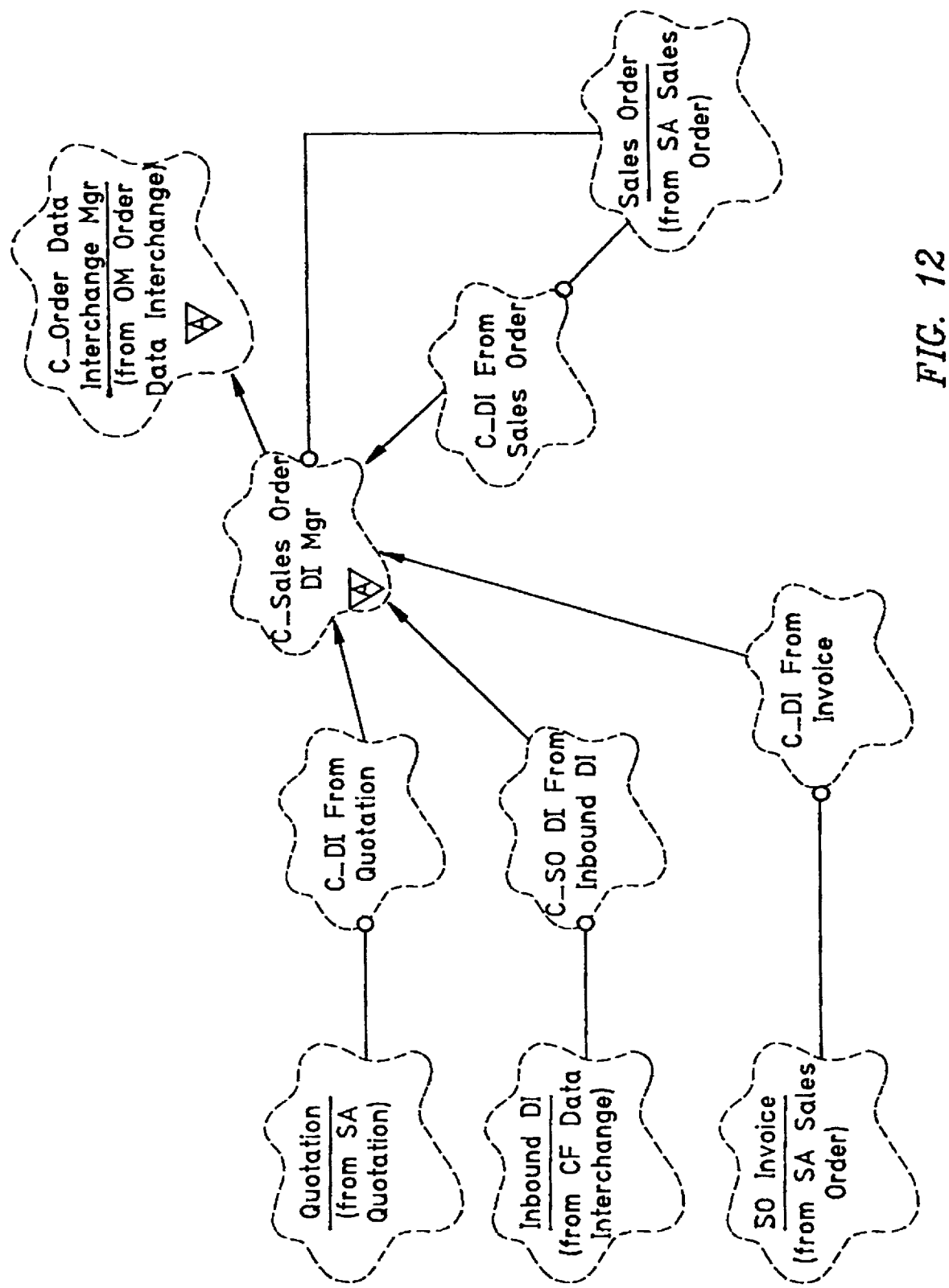
FIG. 12 is a class diagram of the SA Sales Order Data Interchange category illustrated in FIG. 8 showing the Sales Order Data Interchange Manager control class and related classes.

FIG. 12 is a class diagram that illustrates the characteristics of the SA Sales Order Data Interchange category, which selects and standardizes data from miscellaneous sources to create or maintain sales orders. The miscellaneous sources can comprise, for example, quotation sources, electronic data interchange, offline devices, and the like. This category includes the Sales Order Data Interchange Manager class which preprocesses input from miscellaneous sources as a first step in creating or updating orders. This class normalizes data and create an instance of the Sales Order class. This class also inherits some of its structure and behavior from the Order Data Interchange category of the Order Management category. There are several specific sales order sources that use the Sales Order Data Interchange Manager interface. Among these are the Data Interchange from Quotation, which creates a sales order based upon a quotation, the Sales Order DI From Inbound DI, which creates or maintains a sales order based upon input received from an external source such as electronic data interchange. The Sales Order DI Manager also references the Sales Order DI From Inbound DI class, which creates or maintains a sales order based upon input received from an external source, such as electronic data interchange. The manager class also interfaces with the Sales Order DI From Invoice class. The Sales Order DI From Invoice, a class that creates a new Sales Order based upon a previous Invoice, and DI From Sales Order class, a class that creates a new Sales Order based upon a previous Sales Order.

e. SA Sales Price and Discount Category.

Figure 13:
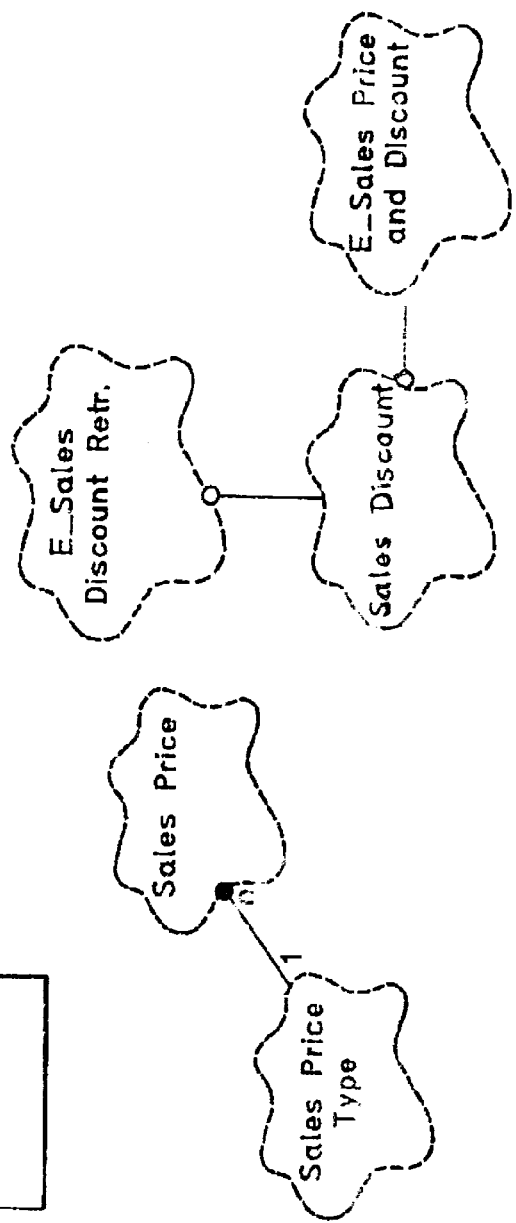
FIG. 13 is a class diagram of the SA Sales Price and Discount category illustrated in FIG. 8, showing the Sales Discount class and related classes.

FIG. 13 is a class diagram that illustrates the characteristics of the SA Sales Price and Discount category that handles the maintenance and retrieval of sales prices and discounts. FIG. 13 shows this category divided into a Sales Price relationship and a Discount relationship. The sales price relationship defines and maintains a sales price for a product. A related Sales Price Type indicates whether a price is for a product or a price group. This relationship involves a Sales Price class and a Sales Price Type class. The Sales Discount category defines and holds a discount for any type of percent or specific value (a line discount or a full order discount). This class holds such information as effective dates and price range limits for discounts.

f. SA Sales Price and Discount Groups Category.

Figure 14:
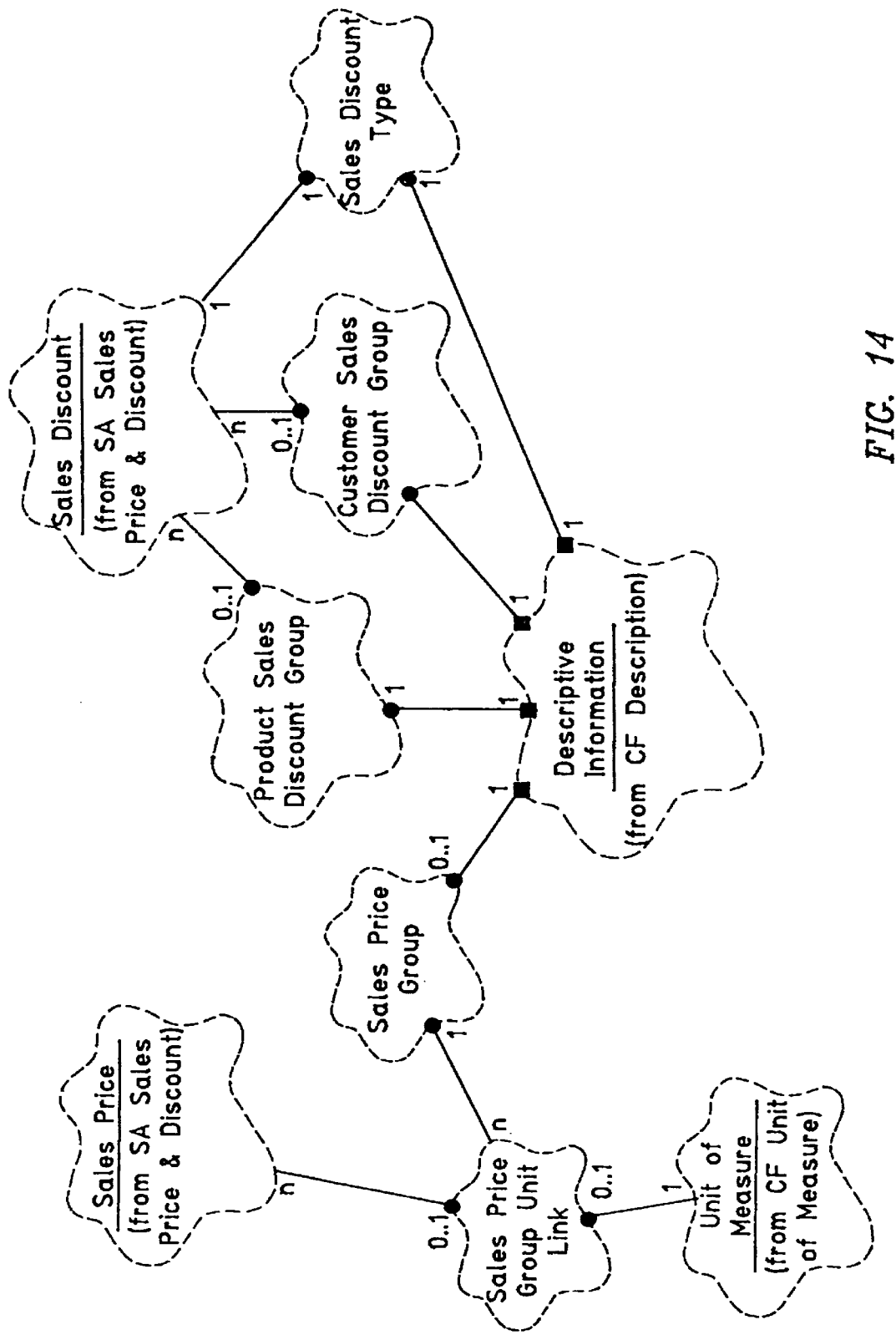
FIG. 14 is a class diagram of the SA Sales Price and Discount Groups category illustrated in FIG. 8, showing the Product Sales Discount Group class, Customer Sales Discount Group class, and related classes.

FIG. 14 is a class diagram that illustrates the characteristics of the SA Sales Price and Discount Groups category that contains information sufficient to create groups of prices and discounts that can be associated with products, customers, and units for efficient maintenance of such groups. Shown in FIG. 14 are Sales Discount Group and Sales Price Group. A Sales Discount is referenced by a Sales Discount Type class, which groups discounts by type, such as volume purchases. The Customer Sales Discount Group class, which groups customers for which the same sales discounts apply, and the Product Sales Discount Group, which contains groups of products for which the same sales discounts apply. The Sales Price Group is similarly defined and groups products for which the same prices apply. This group references the Sales Price Group Unit Link to associate sales prices to the units for which the prices apply.

g. SA Sales Contract Category.

Figure 15:
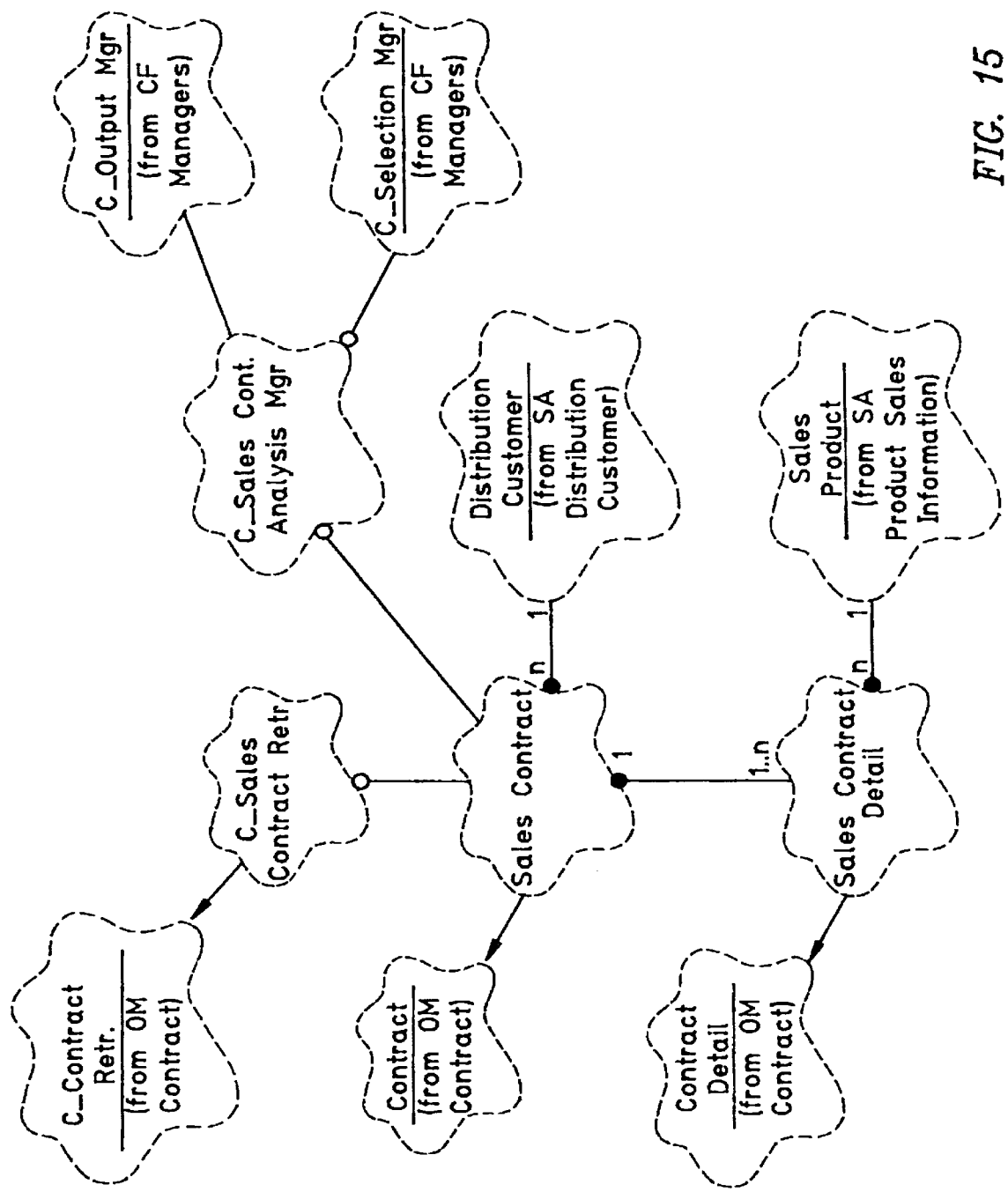
FIG. 15 is a class diagram of the SA Sales Contract category illustrated in FIG. 8, showing the Sales Contract class and related classes.

FIG. 15 is a class diagram that illustrates the characteristics of the SA Sales Contract category that creates and maintains sales contracts. This category also analyzes contracts to track compliance and to close contracts, and determines which contracts apply for a sales order. The Supply Contract category inherits much of its structure and behavior from the Contracts category of the Order Management category. The Sales Contract category of the SA mechanism includes a Sales Contract class, which provides unique capabilities associated with an agreement to sell products to a customer. That is, this class associates a contract with a Distribution Customer. This category also includes the Sales Contract Detail class which provides unique capabilities associated with the product level details of an agreement to sell products to a customer. The category also includes Sales Contract Analysis Manager class that analyzes compliance to Sales Contracts and recommends action. For example, this class monitors a situation where a Customer might have agreed to buy 1200 units of a product but thus far has only purchased 600 units with a contract expiring in one month. The class would indicated some sort of action is required, perhaps correspondence with the Customer. This class references the Selection Manager class to query the set of Sales Contracts and select which ones to analyze, and also references the Output Manager class, which is an extension point to interface with application specific printing functions.

h. SA Sales Price and Discount Requestor Category.

Figure 16:
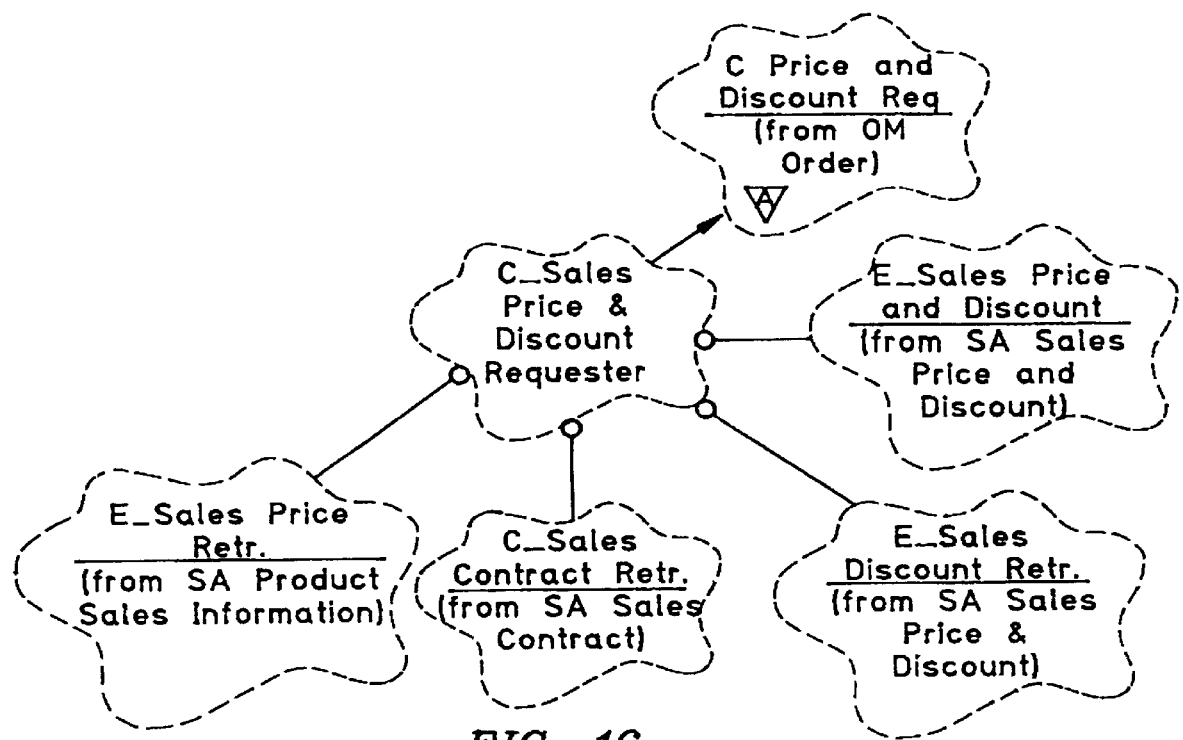
FIG. 16 is a class diagram of the SA Sales Price and Discount Requester category, showing the Sales Price and Discount Requester control class and related classes.

FIG. 16 is a class diagram that illustrates the characteristics of the SA Sales Price and Discount Requestor category that reviews and combines prices, discounts, and sales contracts to define the applicable prices and discounts for an order. This category includes the Sales Price and Discount Requestor class, which has overall responsibility for determining sales prices and discounts. This class references the Sales Price Retriever class, which is an extension class wherein the application developer/framework user can implement business rules to control the retrieval of prices for a product and select among price alternatives. The requestor class also references the Sales Discount Retriever class, which is an extension class wherein the application provider can implement business rules to control the retrieval of discounts for a product and select among discount alternatives. Also referenced by the Sales Price and Discount Requestor class is the Sales Price and Discount Policy class, an extension class in which the application provider can define the business rules to determine which prices and discounts to use under which circumstances and to manage the prioritization between prices and discounts. Finally, the requester class references the Sales Contract Retriever, which determines prices or discounts that apply based upon sales contracts.

i. SA Quotation Category.

Figure 17:
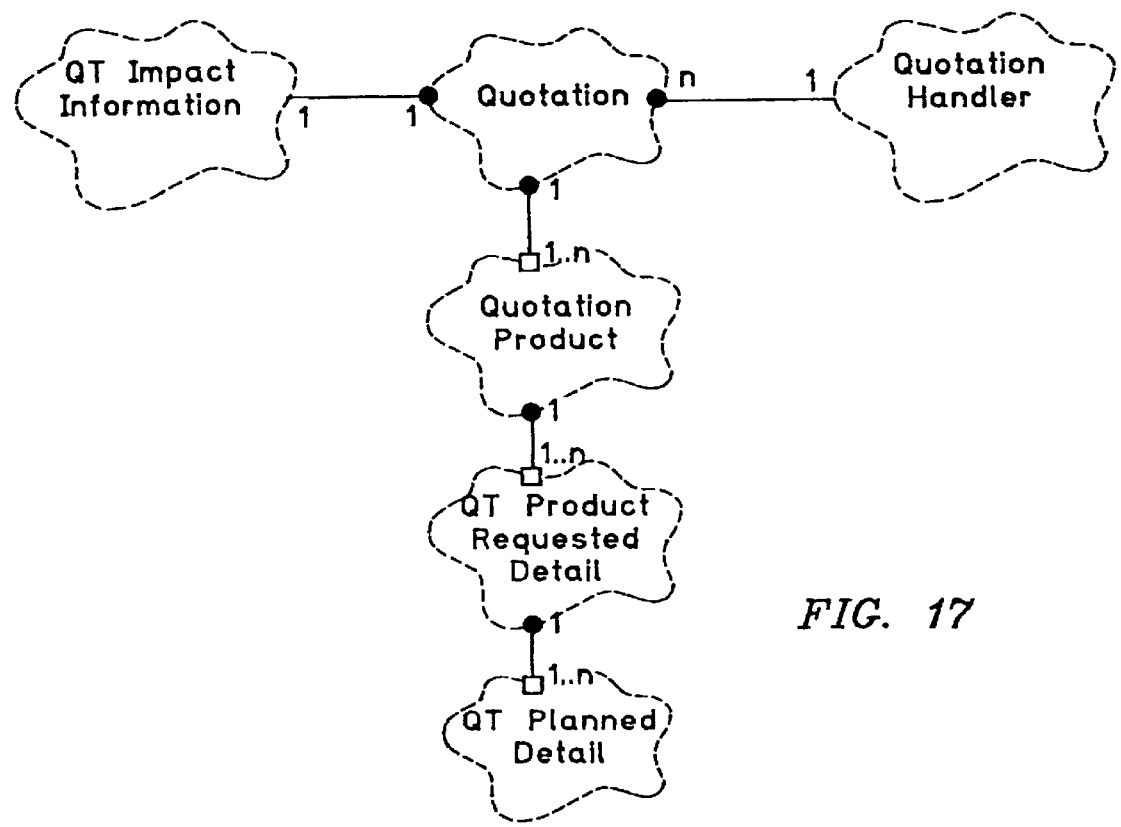
FIG. 17 is a class diagram of the SA Quotation category showing the quotation class and related classes.

FIG. 17 is a class diagram that illustrates the characteristics of the SA Quotation Category that creates, maintains, confirms, and closes a sales quotation. This category will largely be implemented according to the requirements of the application developer/framework user. FIG. 17 shows that the structure of this category includes a quotation class that references a Quotation Handler class, a Quotation Product class, and Impact Information class.

7. PU Category Diagram

Figure 18:
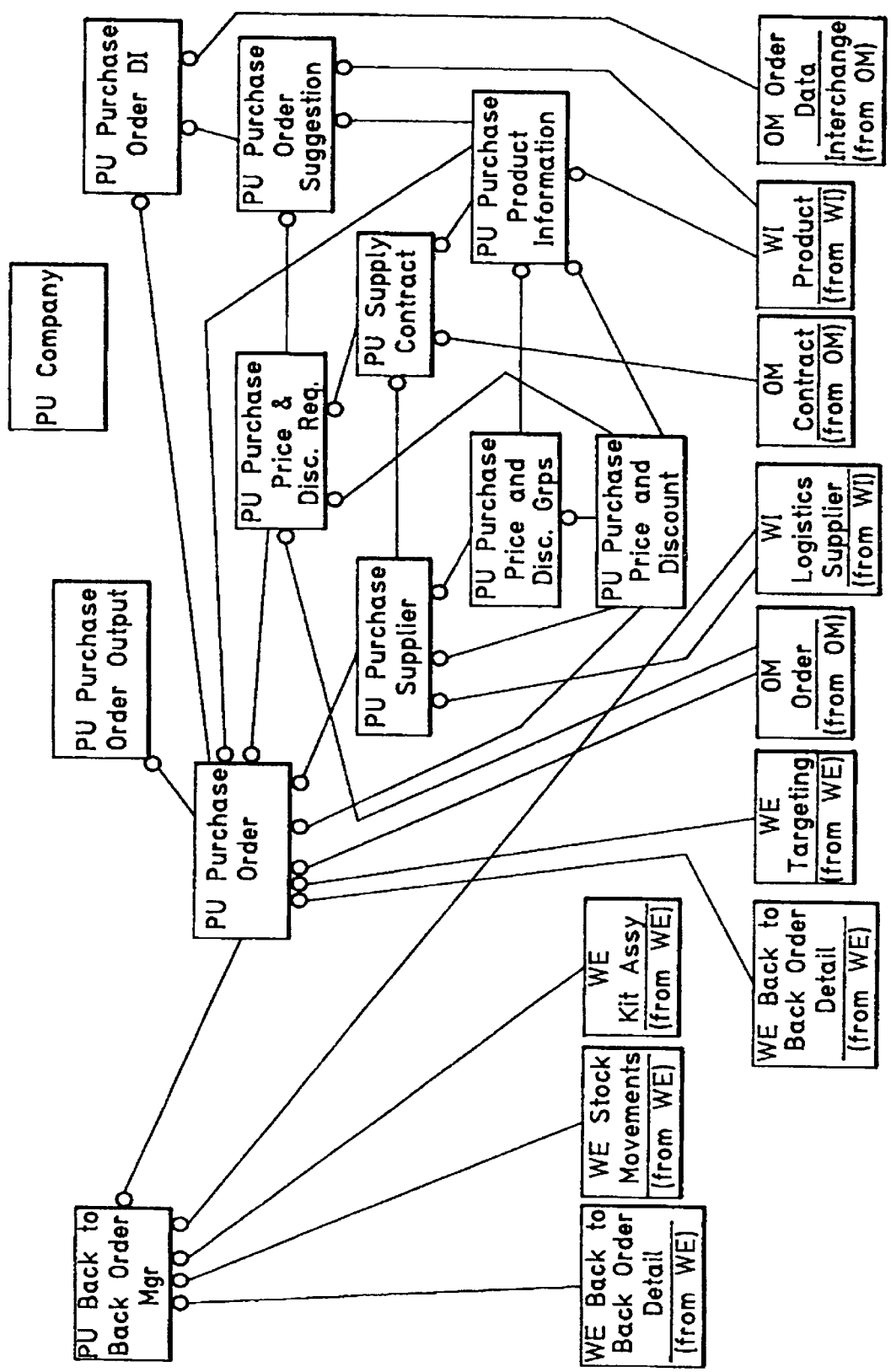
FIG. 18 is a category diagram representation of the PU mechanism illustrated in FIG. 3.

FIG. 18 is a category diagram representation of the Purchase Order (PU) category. Those skilled in the art will appreciate that the categories illustrated in FIG. 18 correspond to OOP objects that encapsulate data attributes and behaviors, and are stored in the memory of the computer system. Such objects can be implemented, for example, in a computer system operating environment that supports the C++ programming language.

FIG. 18 shows that the PU mechanism includes a Purchase Supplier category, a Purchase Product category, a Purchase Order category, a Purchase Order Output category, a Purchase Order Data interchange category, a Purchase Price and Discount category, a Purchase Price and Discount Groups category, a Supply Contract category, a Purchase Price and Discount Requestor category, a Back to Back Order Manager category, and a Purchase Order Suggestion category.

In the preferred embodiment, the PU categories have relationships with categories from the related mechanisms or frameworks illustrated in FIG. 2, such as OM Order, OM Contract, and OM Order Data Interchange from the OM mechanism, WE Back to Back Order Detail, WE Stock Movements, WE Kit Assembly, and WE Targeting, categories from the Warehouse External (WE) mechanism and the WI Logistics Supplier and WI Product categories from the Warehouse Internal (WI) mechanism. As noted above, the WE and WI mechanisms perform product stock, shipping, and transit functions, and exemplary mechanisms that perform these functions are described in the concurrently filed patent application entitled "Object Oriented Technology Framework for Warehouse Control" assigned to IBM Corporation. The processing of these related categories and mechanisms will be described as needed for understanding. Alternatively, those skilled in the art may develop their own warehouse interface and control programs that provide the same functions or may obtain such programs from other suppliers.

a. PU Purchase Supplier.

Figure 19:
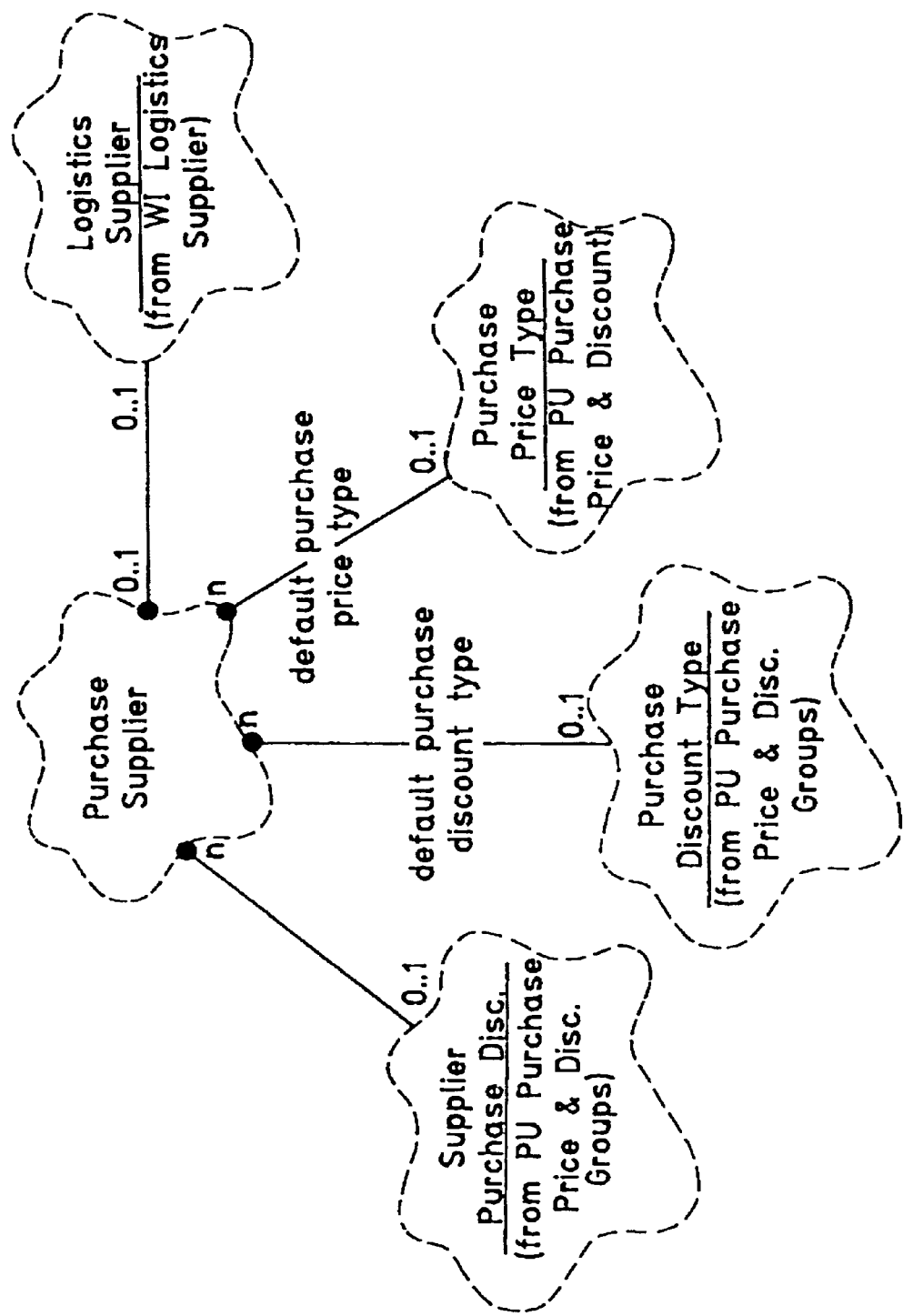
FIG. 19 is a class diagram of the PU Purchase Supplier mechanism illustrated in FIG. 18, showing the Purchase Supplier class and related classes.

FIG. 19 is a class diagram that illustrates the characteristics of the PU Purchase Supplier category illustrated in FIG. 18. The Purchase Supplier category contains Business Partner aspects that are unique to purchase orders. FIG. 19 shows that this category includes the Purchase Supplier class, which holds information about the Business Partner that is unique to the supplier relationship and provides access to the more general capabilities of the Business Partner class, if required. The Purchase Supplier class references the Supplier Discount Group class, which allows suppliers to be organized into groups based upon the type of discount they offer, the Purchase Discount Type class which identifies the type of purchase discount that is the default value for the supplier, and the Purchase Price Type class, which identifies the type of purchase price that is default value for the supplier.

b. PU Product Purchase Information Category.

Figure 20:
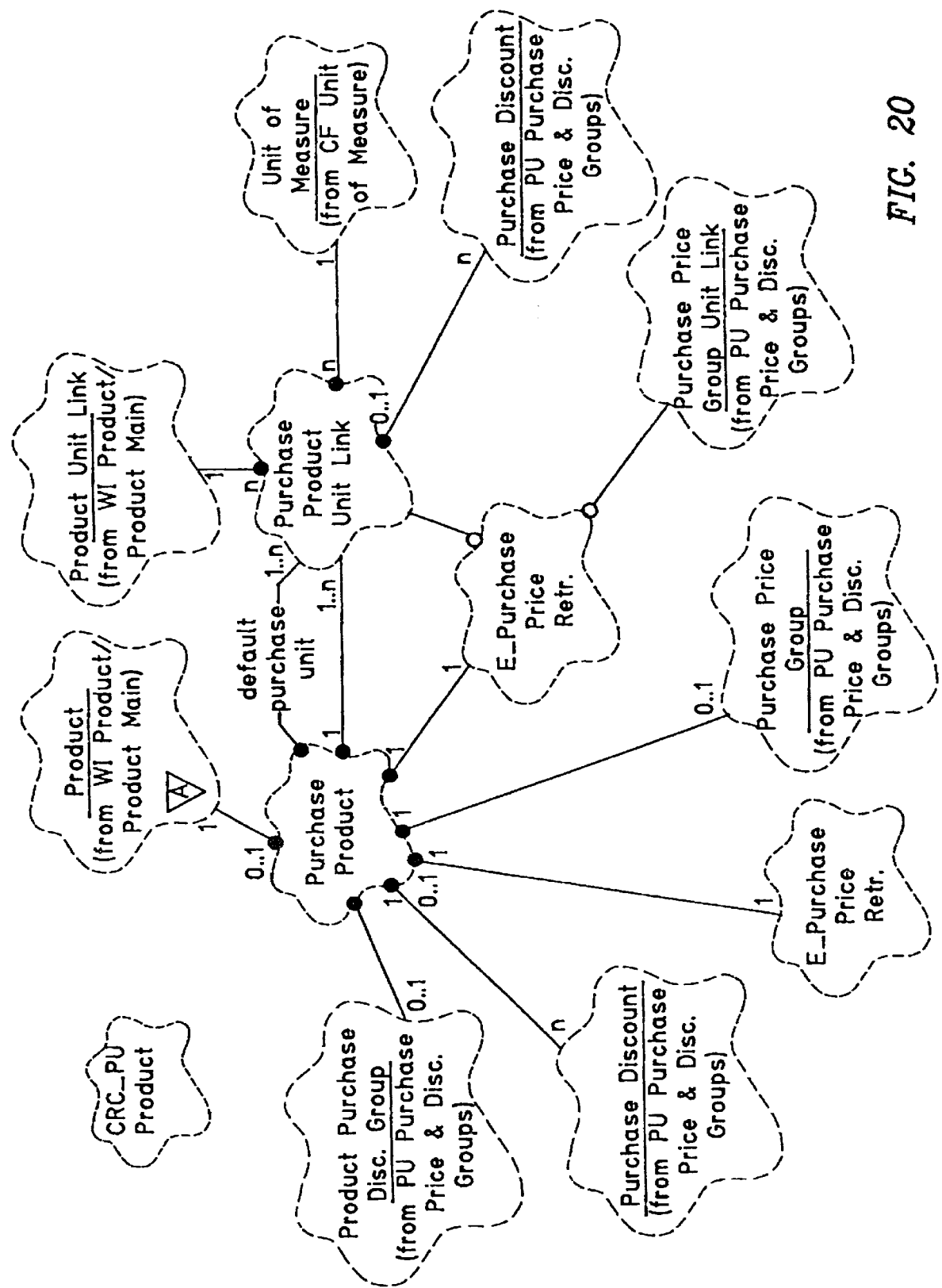
FIG. 20 is a class diagram of the PU Purchase Product Information mechanism illustrated in FIG. 18, showing the Purchase Product Information class and related classes.

FIG. 20 is a class diagram that illustrates the characteristics of the PU Product Purchase Information category illustrated in FIG. 18. This category contains product aspects that are unique to purchase orders. FIG. 20 shows that this category includes the Purchase Product class, which holds information about the Product that is significant only in terms of purchasing the product. This class also provides access to the more general capabilities of the Product in the associated mechanisms, such as the Warehouse Internal mechanism described in the co-pending patent application.

The Purchase Product class references the Product Purchase Discount Group class, which permits products to be organized into groups based upon the type of purchase discount for which they qualify. The Purchase Product also references the Purchase Discount class, which defines the terms and applicability for each of the discounts available for a Purchase Product. Also referenced is the Purchase Price Group class, which permits the Purchase Product to be associated with a Price Group that defines the price for all products in the group. Also referenced is the Purchase Product Unit Link class, which defines the units in which the product can be purchase and holds any attributes related to purchasing the product in a specific unit of measure, including any Purchase Discounts that apply for a specific unit.

FIG. 20 also shows that the Purchase Product class references the Purchase Price Retriever class, which is an extension class in which the application developer/framework user can implement business rules to control the retrieval of prices for the product and to select among price alternatives. The Purchase Price Retriever class references the Purchase Product Unit Link class to find the units in which the product can be purchased and find the unit specific discounts, and also references the Purchase Price Group Unit Link class to identify any Purchase Price Groups that apply if the product is purchased in a specific unit of measure.

c. PU Purchase Order Category.

Figure 21:
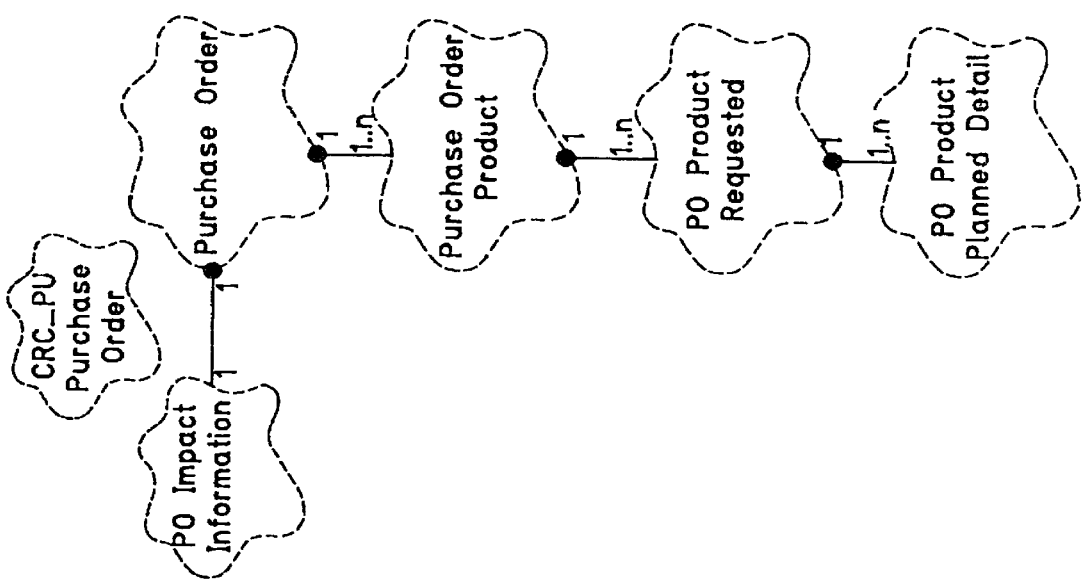
FIG. 21 is a class diagram of the PU Purchase Order category illustrated in FIG. 18, showing the Purchase Order class and related classes.

FIG. 21 is a class diagram that illustrates the characteristics of the PU Purchase Order category illustrated in FIG. 18. This category creates and maintains purchase orders. The category updates an order when it is confirmed by the supplier and confirms delivery for back to back purchase orders that are delivered directly to a customer. The Purchase Order category inherits much of its structure and behavior from the Order category of the Order Management subsystem. Purchase Order category includes the classes of Purchase Order, which has structure and behavior related to the entire Purchase Order category, the Purchase Order Product, which has a structure and behavior for one product being ordered on one purchase order, the Purchase Order Product Requested, which has a structure behavior related to the way in which the company requested the Purchase Order Product from the Purchase Supplier, and includes the Purchase Order Planned Detail class, which has a structure and behavior related to how the Purchase Supplier has fulfilled or will fulfill the Purchase Order Product.

d. PU Purchase Order Output Category.

Figure 22:
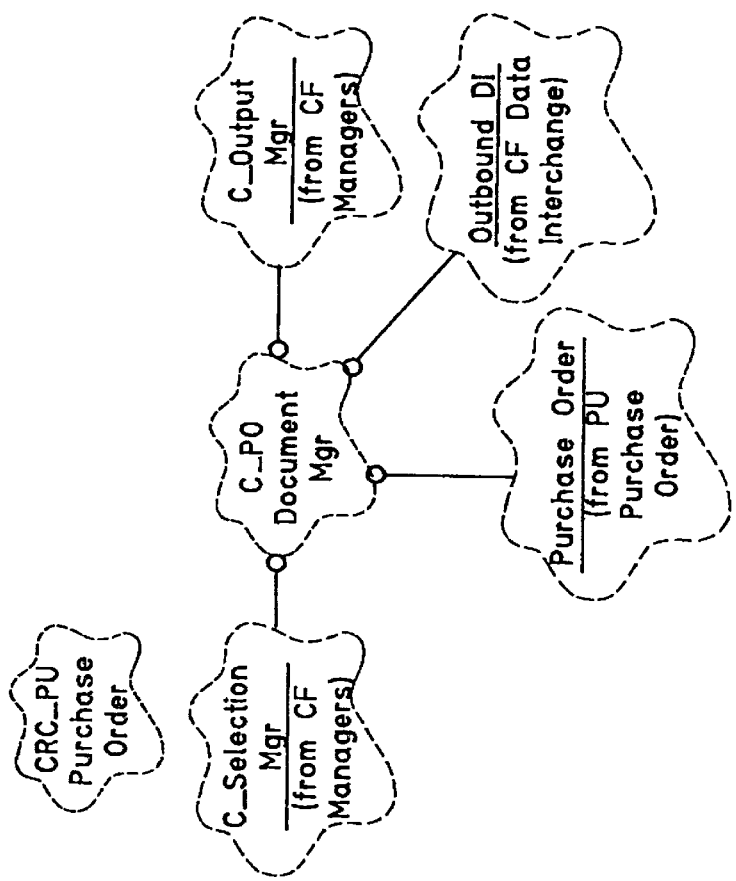
FIG. 22 is a class diagram of the PU Purchase Order Output category illustrated in FIG. 18, showing the Purchase Order Document Manager control class and related classes.

FIG. 22 is a class diagram that illustrates the characteristics of the PU Purchase Order Output category illustrated in FIG. 18. The PU Purchase Order Output category creates the purchase order output that can be used to either print documents or create electronic data interchange transactions. Because printed or electronic output is considered part of the user interface for the application, as a general rule there are no class diagrams to describe output in the description of the analysis model herein. The Purchase Order Output category is included to illustrate the extensive considerations associated with printing a purchase order. The Purchase Order Output category includes the PO Document Manager class, which creates the Purchase Order Output. This control class references the class called Selection Manager, which determines for which Purchase Orders the output should be created, and calls the Purchase Order class, which provides access to all of the primary Purchase Order classes for purposes of creating output. The primary purchase order classes include the Product, Requested Detail, and the Planned Detail classes. The Document Manager class also references the Output Manager class, which is an extension point to interface with applications specific printing functions, and the Outbound Data Interchange, which is an extension point to provide Purchase Order outputs to external destinations, such as electronic data interchange.

e. PU Purchase Order Data Interchange Category.

Figure 23:
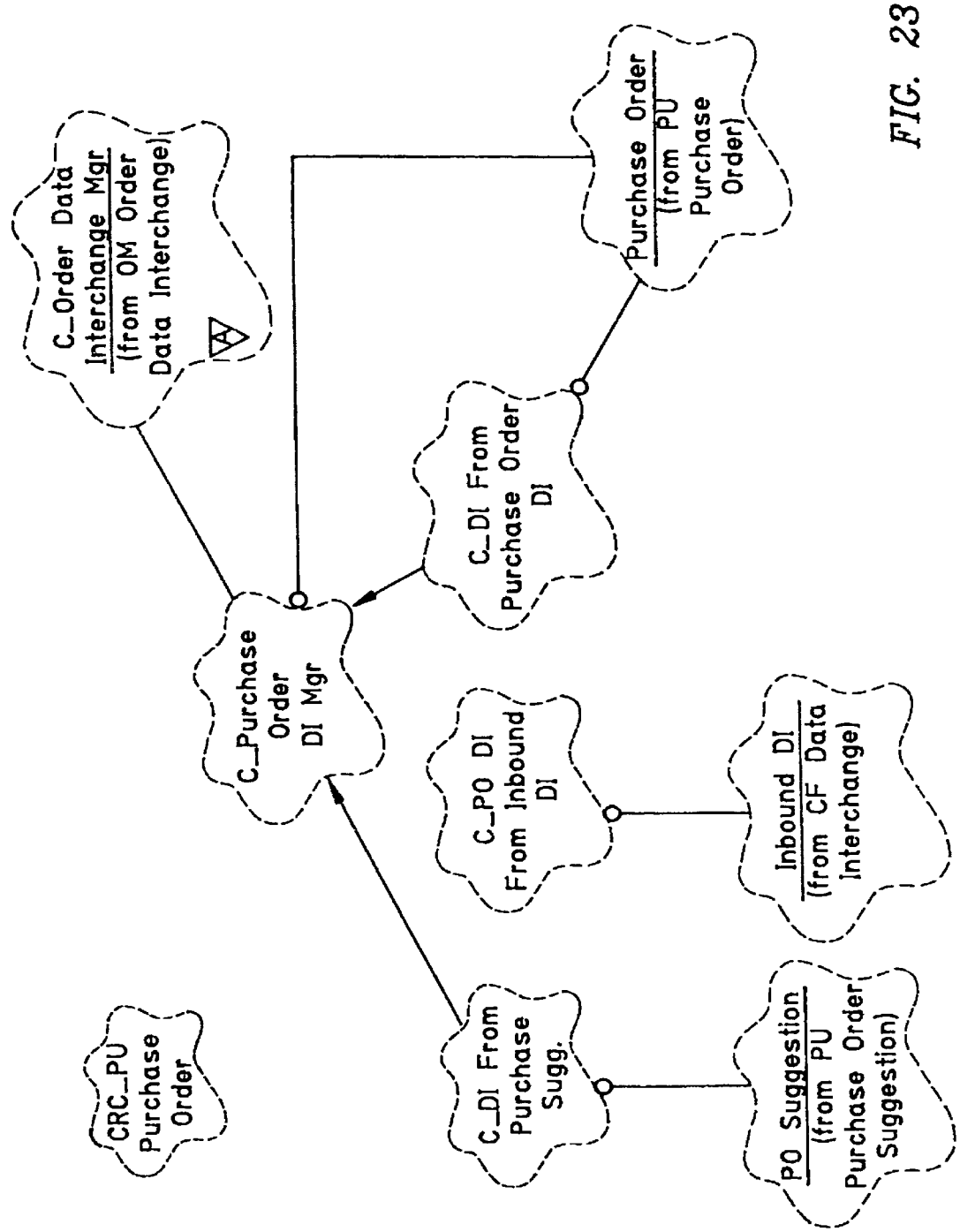
FIG. 23 is a class diagram of the PU Purchase Order Data Interchange category illustrated in FIG. 18, showing the Purchase Order DI class and related classes.

FIG. 23 is a class diagram that illustrates the characteristics of the PU Purchase Order Data Interchange category illustrated in FIG. 18. This category provides a general interface from which purchase orders can be created or updated without using the Purchase Order Management process. The sources for this interface can be of various types, such as purchase order suggestions, electronic data interchange transactions, off-line devices, and the like.

FIG. 23 shows that this category includes a Purchase Order DI Manager class, which preprocesses input from various sources as the first step in creating or updating orders. This class also normalizes data and creates an instance of the Purchase Order class. The Purchase Order DI Manager class inherits some of its structure and behavior from the OM Order Data Interchange category. Several specific purchase order sources use the Purchase Order DI Manager interface, including the DI From Purchase Suggestion class, which creates a purchase order based upon a Purchase Order Suggestion. Another purchase order source using the manager interface class is the PO DI From Inbound DI class, which creates or maintains a purchase order based upon input received from an external source, such as electronic data interchange. Also, the purchase order sources used by the manager interface include the DI From Purchase Order class, which creates a new purchase order based upon a previous purchase order.

f. PU Purchase Price and Discount Category.

Figures 24, 27:
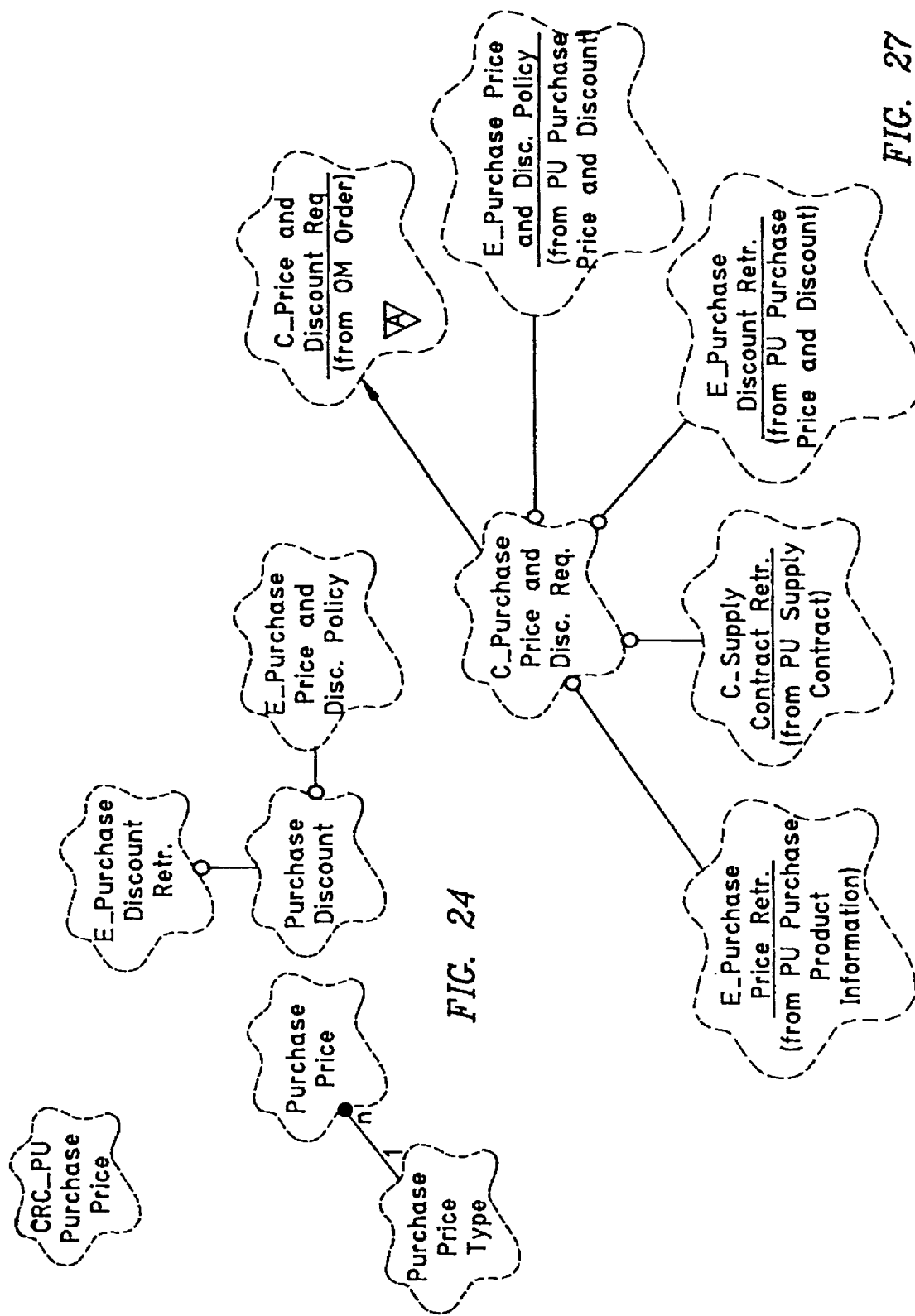
FIG. 24 is a class diagram of the PU Purchase Price and Discount category illustrated in FIG. 18, showing the Purchase Price and Discount Policy class and related classes.
FIG. 27 is a category diagram of the PU Purchase Price and Discount Requester category illustrated in FIG. 18, showing the Purchase Price and Discount Requester class and related classes.

FIG. 24 is a class diagram that illustrates the characteristics of the PU Purchase Price and Discount category illustrated in FIG. 18. This category handles the maintenance and retrieval of the prices and discounts that apply for a product which may be purchased by the company. This category is represented by a Purchase Price class, which defines and maintains a price for a product from a supplier or a price for a member of a price group from a supplier. A related Purchase Price Type class indicates whether a price is for a product or for a price group. The category also includes a Purchase Discount category, which defines and holds a discount of any type, such as percent or specific value, line discount or full order discount. The class holds such information as effective dates and price range limits for discounts.

More particularly, the Purchase Price category handles the maintenance and retrieval of the prices that apply for a product. The Purchase Product class contains a request to maintain or to retrieve a price for a product that would come through the Purchase Product category. The Purchase Product class references the Purchase Price Group class and the Purchase Product Unit Link class, and the Purchase Price Retriever class. The Purchase Price category defines and maintains a price for a product from a supplier or a price for a member of a price group from a supplier.

g. PU Purchase Price and Discount Groups Category.

Figure 25:
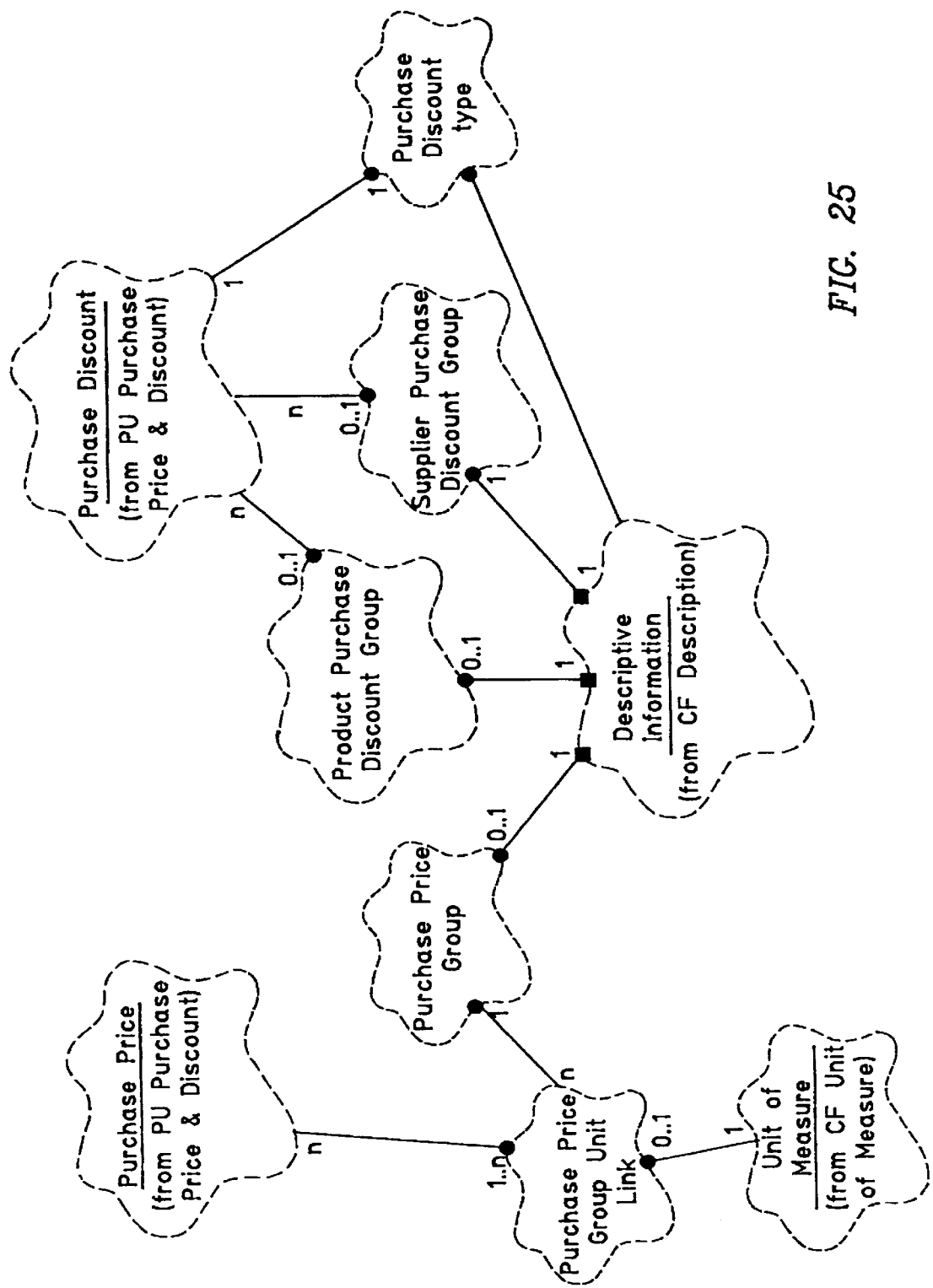
FIG. 25 is a class diagram of the PU Purchase Price and Discount Groups category illustrated in FIG. 18, showing the Product Purchase Discount Group class, Supplier Purchase Discount Group class, and related classes.

FIG. 25 is a class diagram that illustrates the characteristics of the PU Purchase Price and Discount Groups category. Groups contain prices and discounts that can be associated with products, suppliers, and units. It is often desirable to create groups of such associations for more efficient maintenance and access of stock control. In the framework, the Purchase Discount Groups include the Purchase Discount Type class containing group discounts by type, such as volume purchasers. The Purchase Discount groups also include the Supplier Purchase Discount Group class, which collects suppliers for which the same discounts apply, and also includes the Product Purchase Discount Group class, which collects products for which the same discounts apply. The Price and Discount Groups category also includes the Purchase Price Group class, which collects products for which the same prices apply, and references the Purchase Group Units Link class to associate Purchase Prices to the units in which the purchase is made.

h. PU Supply Contract Category.

Figure 26:
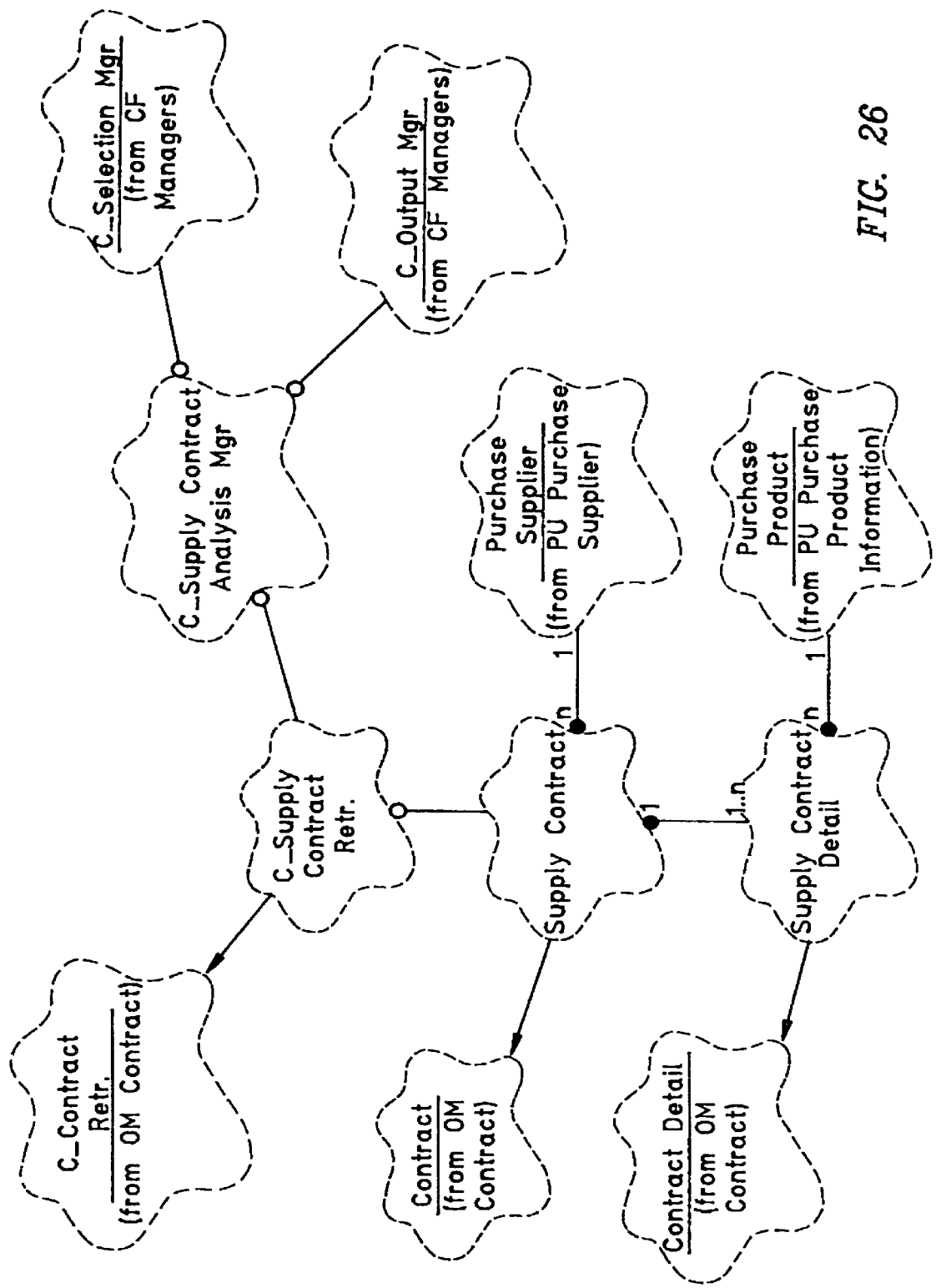
FIG. 26 is a class diagram of the PU Supply Contract category illustrated in FIG. 18, showing the Supply Contract class and related classes.

FIG. 26 is a class diagram that illustrates the characteristics of the PU Supply Contract Category illustrated in FIG. 18. This category creates and maintains supply contracts. It analyzes contracts to track compliance and close contracts, determines which contract applies for a purchase order. This category includes the Supply Contract class, which inherits much of its structure and behavior from the Contracts category of the Order Management subsystem. The Supply Contract class provides unique capabilities associated with an agreement to purchase products from a supplier and associates the contract with a Purchase Supplier. The Supply Contract Detail class provides unique capabilities associated with the product level details of an agreement to purchase products from a supplier. The Supply Contract Analysis Manager class analyzes compliance to Supply Contracts and recommends actions. For example, this class might observe that the Company agreed to buy 1200 units, purchased only 600 units and observed that the contract expires in one month, and would then conclude that some type of action was required. This class references the Selection Manager class to query the set of Supply Contracts and select which ones to analyze, and references the Output Manager class, which is an extension point to interface with application specific printing functions.

i. PU Purchase Price and Discount Requestor Category.

FIG. 27 is a class diagram that illustrates the characteristics of the PU Purchase Price and Discount Requestor category, which retrieves the purchase price and discount for a specific product purchase from a specific supplier, or the lowest price for that product purchased from any supplier. This category includes the Purchase Price and Discount Requestor class, which has overall responsibility for determining purchase prices and discounts. This class references the Purchase Price Retriever class, which is an extension class where the application developer/framework user can implement business rules to control the retrieval of prices for the product and select among price alternatives. The Requestor class also references the Purchase Discount Retriever class, which is an extension class wherein the application developer/framework user can implement business rules to control the retrieval of discounts for the product and select among discount alternatives. The requestor class also references the Purchase Price and Discount Policy class, which is an extension class in which the application developer/framework user can define the business rules to determine which prices and discounts to use under which circumstances and to manage the prioritization between prices and discounts. Finally, the requestor class references the Supply Contract Retriever class, which determines prices or discounts that apply based upon supply contracts.

j. PU Back to Back Order Category.

Figure 28:
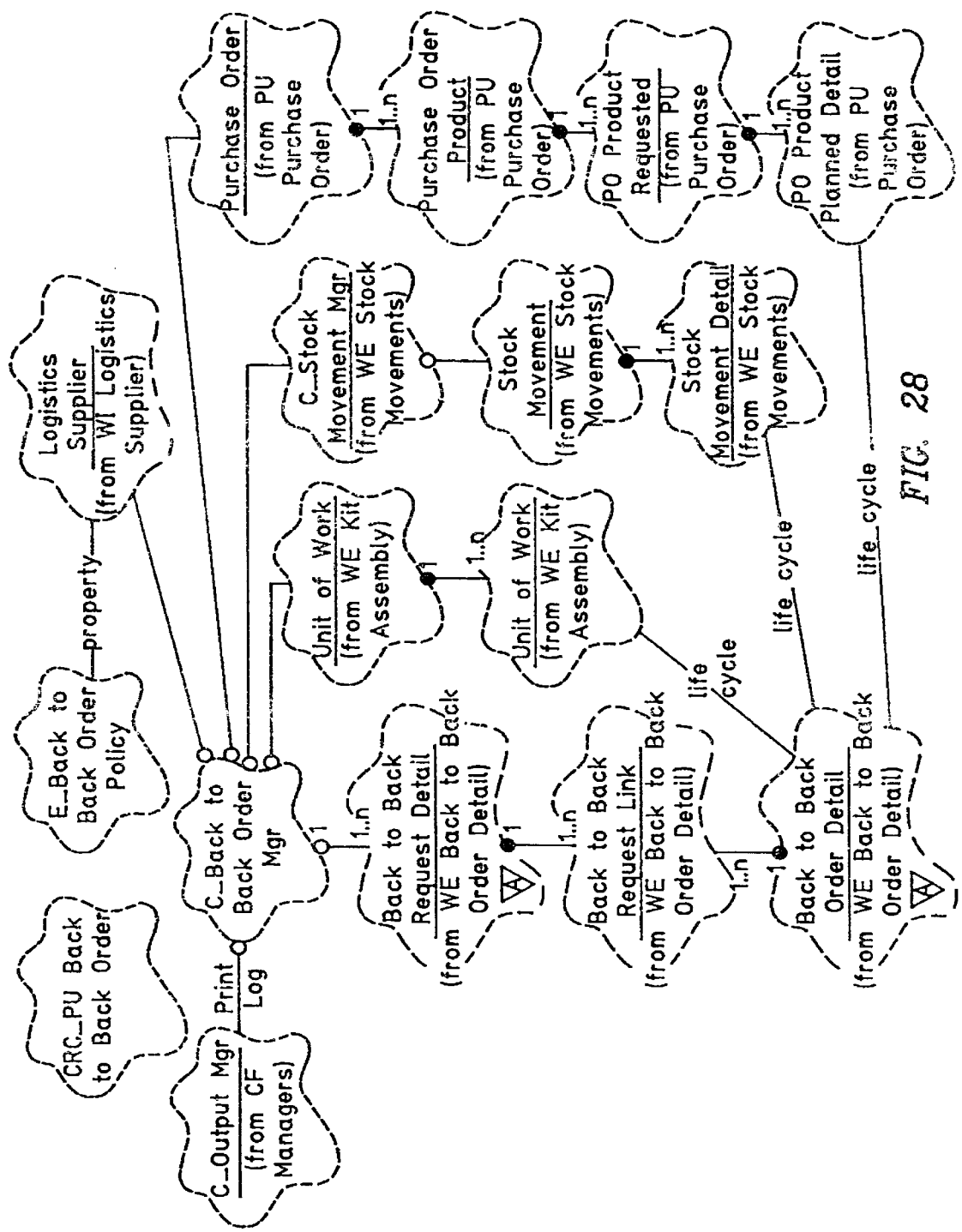
FIG. 28 is a class diagram of the PU Back to Back Order Manager category illustrated in FIG. 18, showing the Back to Back Order Manager control class and related classes.

FIG. 28 is a class diagram that illustrates the characteristics of the PU Back to Back Order category mechanism illustrated in FIG. 18. The PU Back to Back Order category creates and maintains supply orders that are automatically created and linked to specific demands, for example, a purchase order that is directly tied to a specific sales order detail line. This category also manages synchronization when one of the orders changes. The category includes primarily the class called Back to Back Order Manager. This class is responsible for creating and maintaining supply orders, that is, Purchase Orders, Stock Movements, or Kit Assembly Units of Work, that will deliver the products demanded by the Back to Back Request Detail.

The Back to Back Order Manager class references the Back to Back Request Detail class to determine demands, originating from the Sales Order Product Planned Detail class (SA mechanism), which drive the creation of supply orders. The Back to Back Order Manager class also references the Logistics Supplier class to access the Back to Back Order Policy class. The policy class is an extension class wherein the application developer/framework user can implement business rules that control the creation of back to back orders. For example, the framework user may want to restrict operation of the extended framework so that only one purchase order is created per day per product.

Also referenced by the Back to Back Order Manager class is the Purchase Order Class, which will be created by the Back to Back Order Manager at all levels from the Order level down to the Planned Detail level. The Back to Back Order Manager class will potentially consolidate several Back to Back Request Detail classes into a single PO Product Planned Detail. The Manager class also references the Stock Movement Manager class, which is created by the Back to Back Order Manager to supply the Back to Back Request Detail class from another warehouse.

The Back to Back Order Manager class also references the Unit of Work class, which will be created by the manager class to supply the Back to Back Request Detail through kit assembly. Also referenced is the Back to Back Order Detail class, which represents a specific supply of products to completely or partially satisfy one or more Back to Back Request Details. Another class referenced by the Back to Back Order Manager is the Back to Back Request Link class, which provides traceability between the Back to Back Request Detail and the Back to Back Order Detail which will satisfy the request.

k. PU Purchase Order Suggestion Category.

Figure 29:
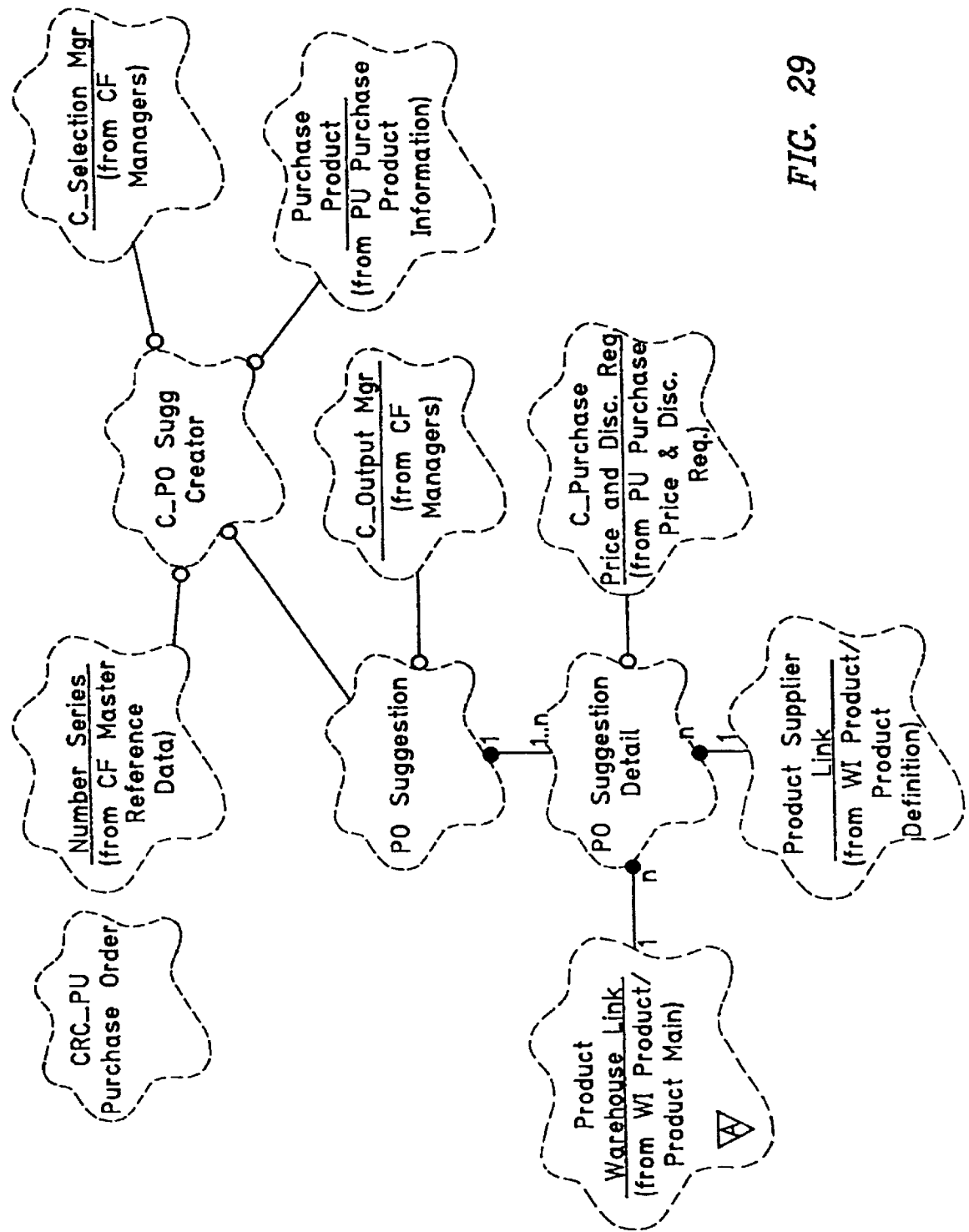
FIG. 29 is a class diagram of the PU Purchase Order Suggestion category illustrated in FIG. 18, showing the Purchase Order Suggestion class and related classes.

FIG. 29 is a class diagram that illustrates the characteristics of the PU Purchase Order Suggestion category illustrated in FIG. 18. The Purchase Order Suggestion category prepares purchase suggestions for externally replenished products by reviewing the current stock situation for products. The purchase suggestions created can be reviewed and amended. When a suggestion is ready for further processing it can be transformed into a purchase order. A suggestion or parts of a suggestion can be turned into an internal replenishment suggestion. The top of FIG. 29 shows that this category includes a creator control class called Purchase Order Suggestion Creator (shown as C_PO Sugg Creator). The PO Suggestion Creator in turn references classes providing further details, including the PO Suggestion Detail class, which in turn references the Product Warehouse Link class, the Product Supplier Link class and the Purchase Price and Discount Request Creator class.

8. Processing of Extended Framework

The framework user/application developer will utilize the class and method definitions, as described above, with appropriate extensions and overrides, to produce a desired application program. Thus, as is the case with object oriented programming principles, details of the extended framework processing will depend on the particular extensions implemented by the framework user. Nevertheless, the processing enabled by the framework can be described in terms of the classes and methods defined by the present invention. Particular processing tasks performed by classes of the extended system can be described in a step-wise, procedural fashion. The following description, therefore, should be understood to apply to the operating steps performed by the extended framework. Those skilled in the art, however, will understand that the flow of processing is not necessarily sequential through the flow diagram boxes, as objects will perform processing in accordance with their attributes and methods.

The framework classes define products, identify suppliers and customers, set up warehouse locations for product inventory, and track shipments as sales orders are received and purchase orders issued. The Sales Order mechanism tracks sales orders as they relate to the product inventory and the Purchase Order mechanism determines when stock must be replenished from outside suppliers and tracks purchase orders, while the Order Management mechanism oversees the operation and provides the interface through which the application program user communicates with the other mechanisms.

a. Sales Order Processing.

The application program to be generated from the framework is intended to help manage the product order processing system of a Company and to manage business transactions with the suppliers and customers of the Company. The Company will be defined to have a certain inventory made up of Products kept at Warehouse Locations, to receive orders for Sales Products from Product Customers, and to issue requests for Purchase Products to Purchase Suppliers via Logistic Suppliers.

Orders for Sales Products will be maintained in the order processing system as Sales Order objects, which will be initially created in response to input received via the user interface of the extended framework system or via the SA Sales Order Data Interchange category illustrated in FIG. 12. One feature of the framework is that sales orders will be confirmed to the customers from which the orders were requested, and invoices will be generated and sent to those customers. The linking of the confirmations and the invoices with the sales orders is the responsibility of the SA Sales Order category illustrated in FIG. 11.

Figure 30:
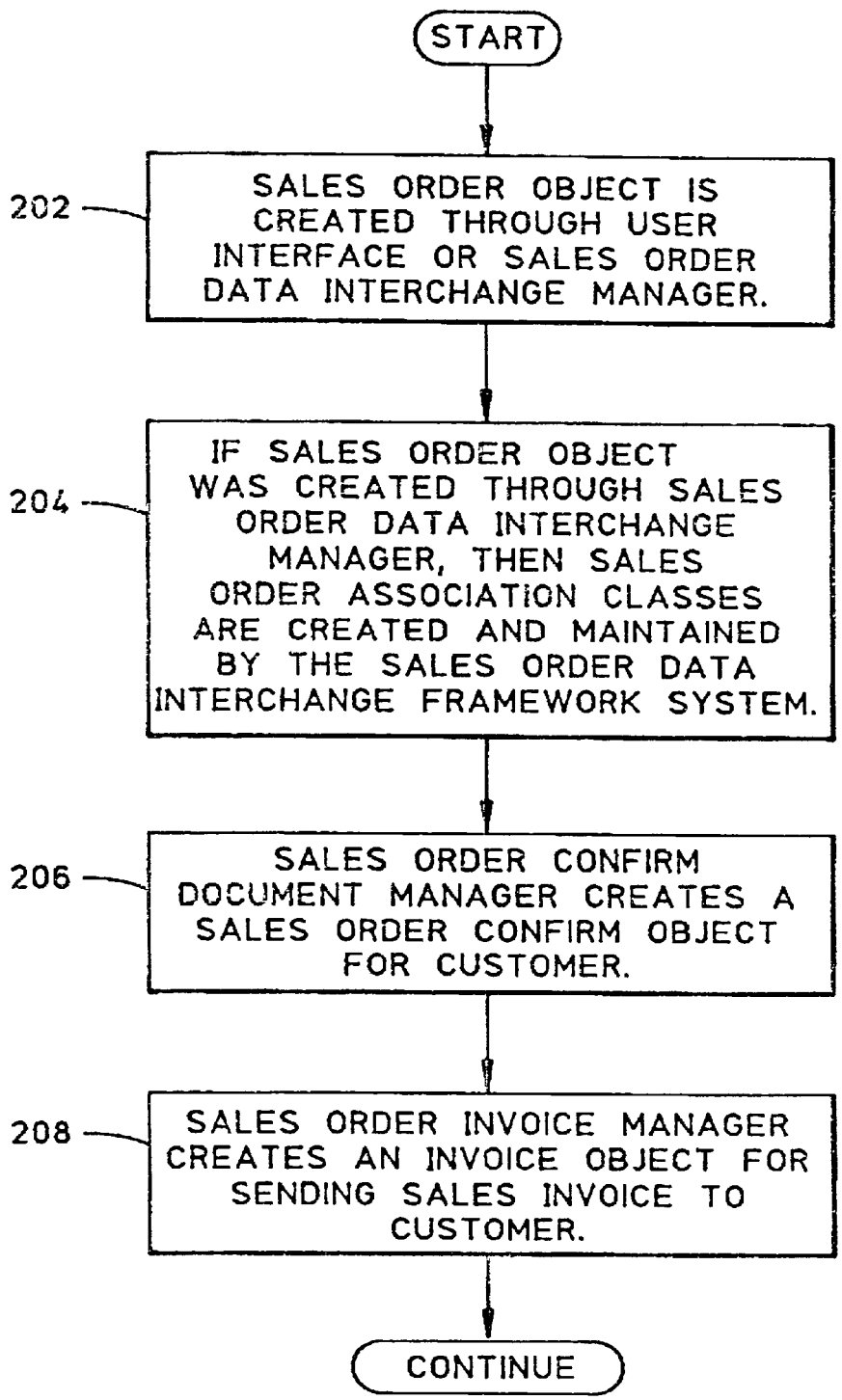
FIG. 30 is a flow diagram representation of the processing carried out by the SA Sales Order category illustrated in FIG. 11 and the SA Sales Order Data Interchange category illustrated in FIG. 12.

FIG. 30 is a flow diagram representation of the SA Sales Order category and SA Sales Order Data Interchange processing. The first step illustrated, represented by the flow diagram box numbered 202, is for a Sales Order object to be created. This can be initiated by the application program user interacting with the Sales Order object via the end-user interface. When a Sales Order object is created through the user interface, input attribute values are entered via the user interface as part of the functioning represented by the flow diagram box numbered 202.

Alternatively, the Sales Order object can be created based upon data received from external sources through the capabilities of the Sales Order Data Interchange category, under control of the Sales Order Data Interchange Manager, which is a control class. A control class is responsible for initiating computer system actions in response to received information, such as a request to create an order. In the case of the SA Sales Order Data Interchange category, the Sales Order Data Interchange Manager is responsible for overseeing the processing of inputs from potentially several sources (on-line users, computer memory, network data files, and so forth) to create sales orders and update their status. The Sales Order Data Interchange Manager might not actually carry out specified actions, but it will be responsible for initiating such actions and, for purposes of this description, will be characterized as carrying out or performing such actions.

If the Sales Order object is created by the Sales Order Data Interchange Manager, then the next processing is for the manager to create and maintain objects of the requisite classes. This processing is represented by the flow diagram box numbered 204. The processing of this step includes the Sales Order Data Interchange Manager selecting attributes based on whether the sales order is to be based on a Quotation, an Inbound Data Interchange (an external data source), a previous invoice, or a previous Sales Order. Such input information includes data such as customer identity, product number, order quantity, pricing, order destination, and the like.

In the next processing step, the Sales Order Confirmation Document Manager creates a Sales Order Confirm object, which results in the generation of a confirmation document that is produced through the CBOF common business objects framework and that is sent to the customer. This processing is represented by the flow diagram box numbered 206. The last step is for the Sales Invoice Manager to create an Invoice object, which is sent to the customer. This processing is represented by the flow diagram box numbered 208. Processing of the system then continues.

b. Sales Contract Processing.

The framework permits tracking of sales contracts, which are different from sales orders in that sales contracts imply an on-going sale of products and shipment of them. Typically, sales contracts involve an agreement to supply a set amount of products (and for the customer to agree to pay for them) over a set period of time. Such contracts are also known as supply contracts. In filling such sales contracts, price adjustments (such as quantity discounts) are sometimes granted. Such actions are the province of the Sales Price and Discount Requestor. The sales contracts are managed in the system by the SA Sales Contract category illustrated in FIG. 15 and used by the SA Prices and Discounts Requestor category illustrated in FIG. 16.

Figure 31:
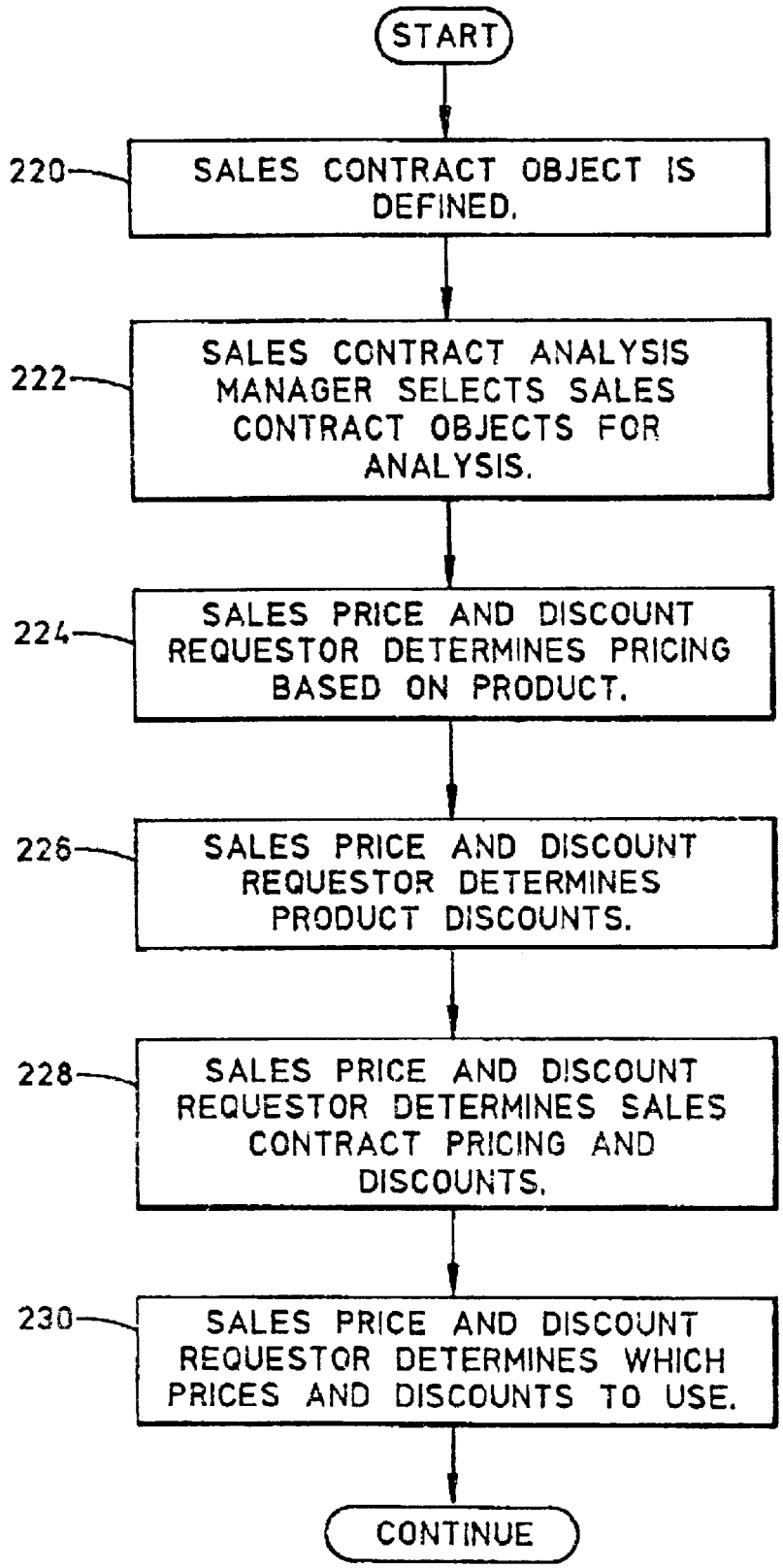
FIG. 31 is a flow diagram representation of the processing carried out by the SA Sales Contract category illustrated in FIG. 15 and the SA Sales Price and Discount Requestor category illustrated in FIG. 16.

FIG. 31 is a flow diagram representation of the SA Sales Contract and SA Sales Price and Discount Requestor processing. The first step is shown as the flow diagram box numbered 220, which indicates that a Sales Contract is created by user action. As described above for FIG. 30, this processing is initiated by the user through the user interface. In the next step, the Sales Contract Analysis Manager selects Sales Contract objects for analysis and recommendation. This processing may include, for example, determining that a customer is behind in periodic purchases required by a sales contract. This processing is represented by the flow diagram box numbered 222.

In the next processing step, the Sales Price and Discount Requestor object determines product pricing based on information from the Sales Price Retriever object for the Product. This processing is represented by the flow diagram box numbered 224. In the next processing step, indicated by the flow diagram box numbered 226, the Sales Price and Discount Requestor object determines product discounts based on information from the Sales Price Retriever object. The flow diagram box numbered 228 shows that the next step is for the Sales Price and Discount Requestor object to determine the pricing or discounts that apply to the product based upon information about the Sales Contract. Finally, in the last step shown by the flow diagram box numbered 230, the Sales Price and Discount Requestor object determines which mix of prices and discounts to use, if any, according to business rules specified by the Sales Price and Discount Policy class. Processing in the system then continues.

c. Purchase Order Processing.

Purchase orders for products are maintained in the order processing system as Purchase Order objects, which will be initially created in response to input received via the user interface of the extended framework system. A Purchase Order is for Products from a Purchase Supplier, who may be selected from a pool of Business Partner companies from the CF. Purchase Orders can be created through the Purchase Order user interface. Alternatively, they can be created by the Purchase Order Data Interchange Category in response to several sources, either an input from an external source (such as an electronic data interchange), or a previous Purchase Order, or from a Purchase Order Suggestion. The pricing for a product is determined by the PU Purchase Price and Discount Requestor category illustrated in FIG. 27.

Figure 32:
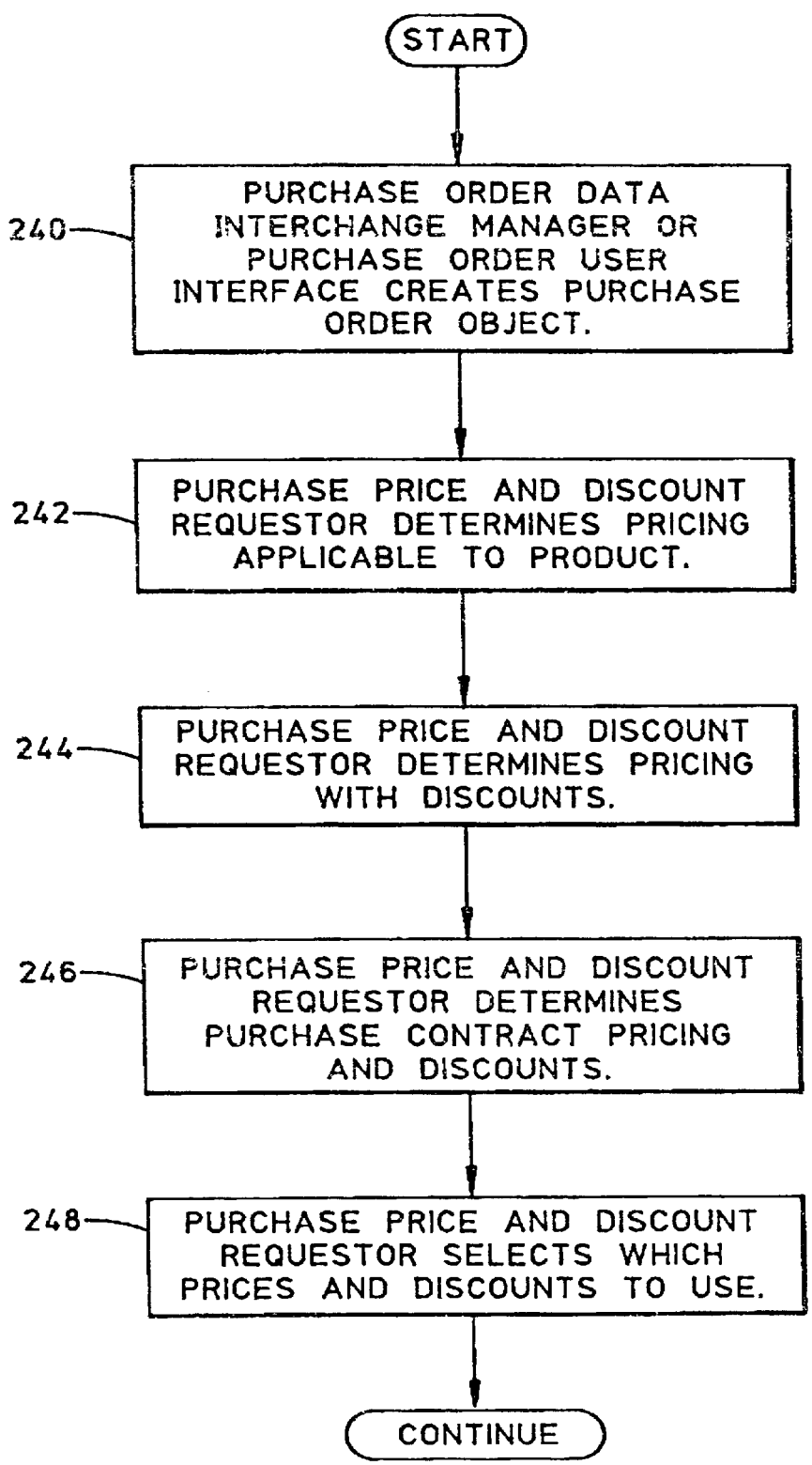
FIG. 32 is a flow diagram representation of the processing carried out by the PU Purchase Order Data Interchange category illustrated in FIG. 23 and the PU Purchase Price and Discount Requestor category illustrated in FIG. 27.

FIG. 32 is a flow diagram representation of the PU Purchase Order Data Interchange category and PU Purchase Price and Discount Requestor category processing. The first step illustrated, represented by the flow diagram box numbered 240, is for a Purchase Order object to be created (or updated). As noted above, Purchase Order creation can be in response to an external source (such as an electronic data interchange), or a previous Purchase Order, or a Purchase Order Suggestion. This processing is carried out under control of the Purchase Order Data Interchange Manager control class object (FIG. 23). It should be understood that a source initiating the creation or updating of a Purchase Order also provides sufficient information to specify the Product and Supplier involved.

After the Purchase Order object is created, the Purchase Price and Discount Requestor category retrieves the purchase price and discount, if applicable, for a product. The processing of this category is the responsibility of an object from the Purchase Price and Discount Requestor class (FIG. 27). In the next step, the Purchase Price and Discount Requestor object obtains applicable prices that apply to purchases of the Product, based on information from the Supply Contract Retriever object. The processing of this step is represented by the flow diagram box numbered 242.

The next processing step is represented by the flow diagram box numbered 244 and involves the Purchase Price and Discount Requestor object determining discounts that apply to the Product. Next is the Purchase Price and Discount Requestor object determining prices or discounts that apply to the Purchase Order based on supply contracts. This processing step is represented by the flow diagram box numbered 246. Finally, the Purchase Price and Discount Requestor object selects the prices and discounts to use for the Purchase Order based on business rules to apply to the mix of pricing and discounts. This processing step is represented by the flow diagram box numbered 248. Processing of the system then continues.

d. Supply Contract Processing.

A supply contract is an agreement whereby the Company agrees to purchase a quantity of products from a supplier. That is, there is an obligation for purchase of Products by the Company, who is the end-user of the application program extended from the framework of the present invention, and whose production and order processing are being managed. The management of the supply contract situation is the responsibility of the PU Supply Contract category illustrated in FIG. 26. The processing of this category is illustrated in the flow diagram of FIG. 33.

Figure 33:
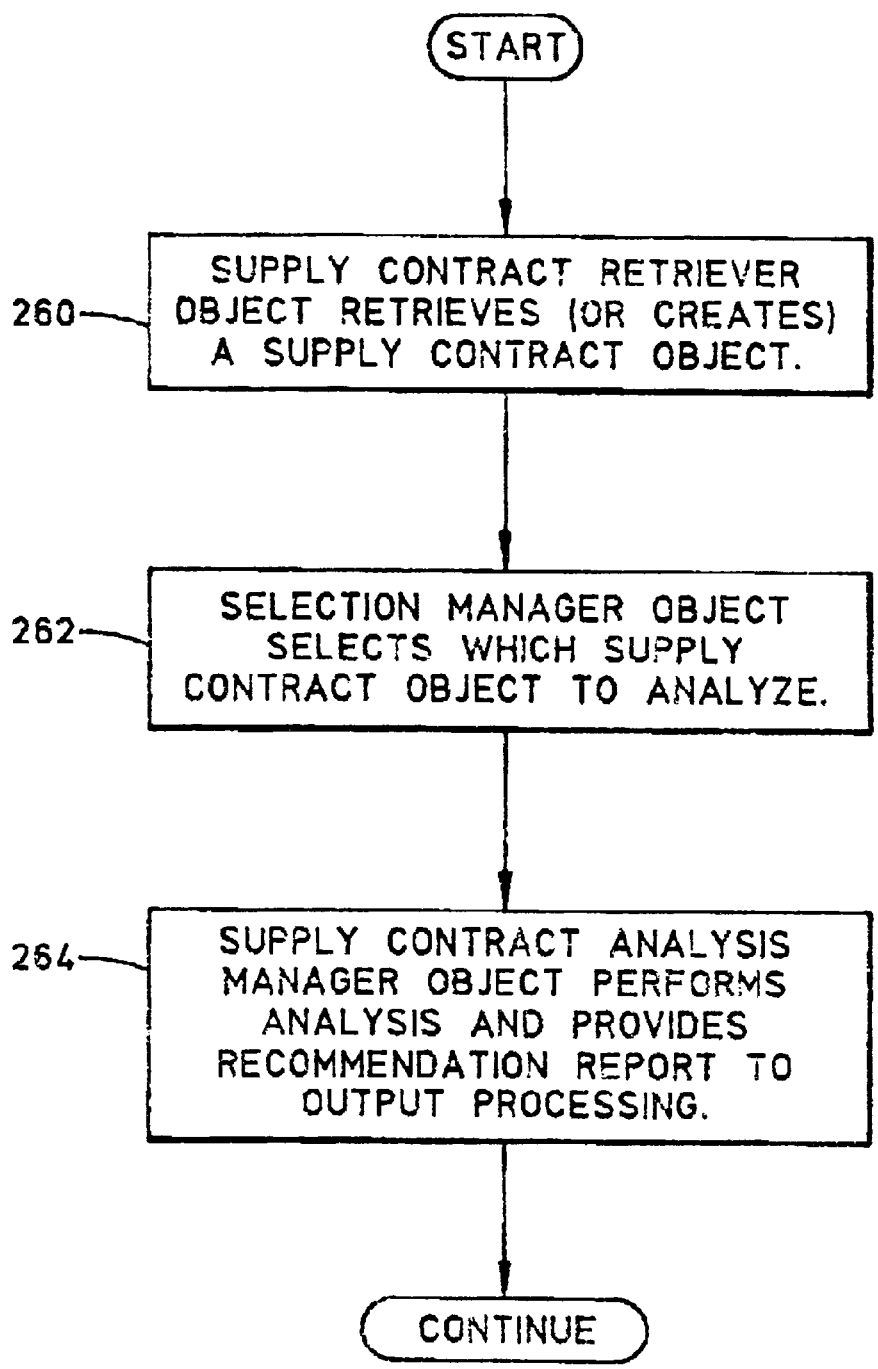
FIG. 33 is a flow diagram representation of the processing carried out by the PU Supply Contract category illustrated in FIG. 26.

The FIG. 33 flow diagram shows that PU Supply Contract category processing begins with the creation of a Supply Contract object by user action through the user interface. This processing is represented by the flow diagram box numbered 260. Next, after Supply Contracts have been created, the Selection Manager queries the set of Supply Contract objects and selects a Supply Contract for analysis, as indicated by the flow diagram box numbered 262. The Supply Contract Retriever object retrieves the Supply Contract, represented by the flow diagram box numbered 264. The Supply Contract Analysis Manager object then performs an analysis to determine if the Company is in compliance with the terms of the supply contract, generating a report in accordance with the user interface and CF interface defined by the application program developer. This processing step is represented by the flow diagram box numbered 266. System processing then continues.

e. Back to Back Order Processing.

Figure 34:
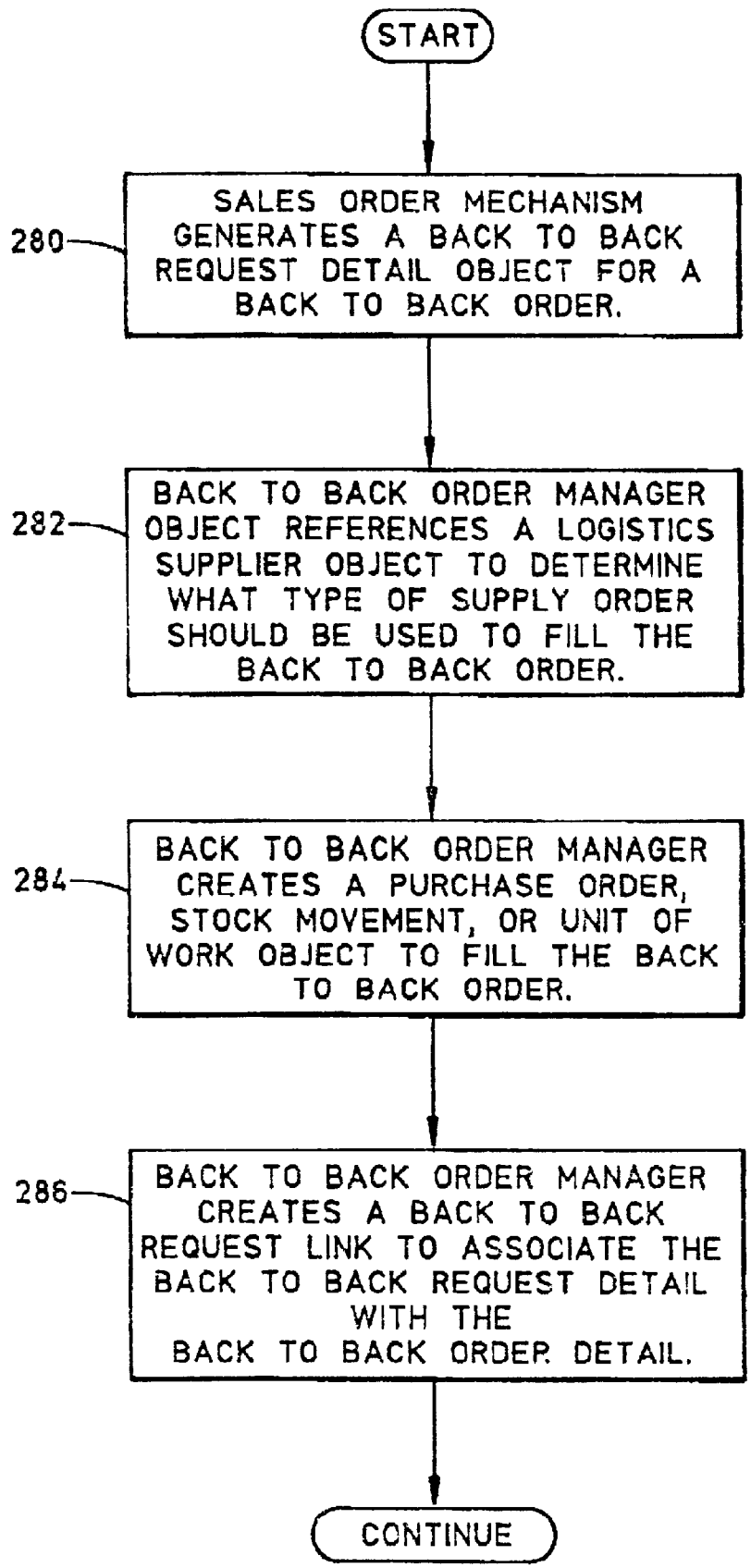
FIG. 34 is a flow diagram representation of the processing carried out by the PU Back to Back Order category illustrated in FIG. 28.

A back to back order is an order for one or more products that, once received by the Company, are immediately sent back out to a customer. Thus, a back to back order is a sales order (customer purchase) that causes the creation of, and is linked to, a supply order (Company request for a supply quantity). The processing of such back to back orders is the responsibility of the PU Back to Back Order Manager category illustrated in FIG. 28. The processing of the category is illustrated in the flow diagram of FIG. 34.

In the first step of processing, the Sales Order mechanism (described above under the section "6. SA Category Diagram" and FIGS. 8–17) causes creation of a Back to Back Request Detail object in response to a back to back request from a customer. More particularly, the Sales Order Planned Detail class described above is an abstract base class that specifies the attributes and behavior of the Back to Back Request Detail class objects. This first processing step is represented by the FIG. 34 flow diagram box numbered 280. The back to back order will be filled by either a Purchase Order (to obtain supplies not currently in inventory), or a Stock Movement (to obtain supplies from products already in inventory), or a Unit of Work (required where a back to back order requires assembly of a kit of supplies). Therefore, in the next processing step, the Back to Back Order Manager object references a Logistics Supplier object to determine what type of supply order should be used to fill the back to back order. This processing step is indicated by the FIG. 34 flow diagram box numbered 282.

In the next processing step, the Back to Back Order Manager creates a Back to Back Order Detail object that specifies the particulars of either the Purchase Order, Stock Movement, or Unit of Work necessary to fill the back to back order. This processing step is represented by the FIG. 34 box numbered 284. In the last illustrated step, represented by the flow diagram box numbered 286, the Back to Back Order Manager creates a Back to Back Request Link object to associate the Back to Back Request Detail with the Back to Back Order Detail, thereby permitting tracing of Back to Back Order status. System processing then continues.

ADVANTAGES OF THE INVENTION

Thus, the preferred embodiment of the object oriented framework of the present invention includes an Order Management (OM) mechanism that tracks orders that are received and matches them to warehouse inventory, a Sales Order (SA) mechanism that processes sales orders, and a Purchase Order (PU) mechanism that processes purchase orders. The OM mechanism comprises a category of OOP classes that provide the primary interface between the framework classes and underlying business objects that provide accounting functions and warehouse management interfaces, and the SA and PU mechanisms comprise respective categories of OOP classes that keep track of sales orders received and purchase orders issued.

The present invention has been described above in terms of presently preferred embodiments so that an understanding of the present invention can be conveyed. There are, however, many configurations for computer systems and object oriented programming systems not specifically described herein but with which the present invention is applicable. The present invention should therefore not be seen as limited to the particular embodiments described herein, but rather, it should be understood that the present invention has wide applicability with respect to object oriented computer systems generally. All modifications, variations, or equivalent arrangements that are within the scope of the attached claims should therefore be considered to be within the scope of the invention.

We claim:

1. A computer data processing system comprising:
   a central processing unit;
   a user interface; and
   a main memory having an operating system that supports an object oriented programming environment containing a framework that provides an extensible order management system for a Company that is specified by a data object, the framework including a Sales Order mechanism comprising a Sales Order category of cooperating objects that identify one or more sales orders and a Purchase Order category of cooperating objects that identify one or more purchase orders.

2. A computer data processing system as defined in claim 1, wherein:
   each Sales Order object references object classes that identify products that are the subject of the sales order and identifies pricing and discounts applicable to the products; and
   each Purchase Order object references object classes that identify products that are the subject of the purchase order and identify pricing and discounts applicable to the products.

3. A computer system as defined in claim 2, wherein the Sales Order mechanism further includes a Sales Contract Analysis Manager class object that selects Sales Contract class objects that specify contracts between the Company and customers for customer purchase of products and analyzes the selected Sales Contracts.

4. A computer system as defined in claim 3, wherein the Sales Order mechanism further includes a Sales Price and Discount Requestor class object that determines Sales Contract product pricing and discounts.

5. A computer system as defined in claim 2, wherein the Purchase Order mechanism further includes a Purchase Price and Discount Requestor class object that:
   (a) analyzes Purchase Order class objects specifying agreements by the Company for the purchase of Products from Logistic Supplier class objects that identify suppliers of the Products; and
   (b) determines pricing and discounts of Purchase Orders for Products.

6. A computer system as defined in claim 5, wherein the Purchase Order mechanism further includes a Supply Contract Retriever class object that maintains cooperating objects relating to a Supply Contract class object that specifies a supply contract between the Company and a Logistics Supplier entity that obligates the Company for the purchase of Products from the Logistics Supplier.

7. A computer system as defined in claim 6, wherein the Purchase Order mechanism further includes a Supply Contract Analysis Manager class object that performs analysis on Supply Contracts concerning unfulfilled terms of the contracts.

8. A computer system as defined in claim 5, wherein:
   the Sales Order mechanism further includes a Sales Order Planned Detail class object specifying that a Sales Order for a Product will be filled by first generating a Back to Back Request Detail class object for the Product, such that the Back to Back Request Detail species either a Purchase Order for the Product, or a Stock Movement class object identifying the Product in current inventory, or a Unit of Work class object specifying a group of inventory components from which the Product will be assembled; and
   the Purchase Order mechanism includes a Back to Back Order Manager class object that responds to the generated Back to Back Request Detail object by creating a Back to Back Order Detail class object that contains data identifying the back to back order.

9. A computer system as defined in claim 8, wherein the Back to Back Order Manager class object references a Logistics Supplier class object that specifies attributes of the Back to Back Request Detail class object.

10. A program product data storage device, tangibly embodying a program of machine-readable instructions executable by a computer system having an operating system that supports an object oriented programming environment, the program product comprising:
    a recordable media;
    a framework recorded on the recordable media, the framework having
    (a) an Order Management mechanism comprising an Order abstract base class specifying data structures that identify orders received by a company from customer business partners for products,
    (b) a Sales Order mechanism comprising a Sales Order category of data structures containing object classes that identify one or more sales orders received from customers of the company, each sales order referencing object classes such that the referenced objects identify products that are the subject of the sales order and identify pricing and discounts applicable to the products, and are abstracted from the Order class, and
    (c) a Purchase Order mechanism comprising a Purchase Order category of data structures containing object classes that identify one or more purchase orders issued by the company, each purchase order referencing object classes such that the referenced objects identify products that are the subject of the purchase order and identify pricing and discounts applicable to the products, and are abstracted from the Order class.

11. An object oriented extensible order management system framework for use in a computer system having an operating system that supports an object oriented programming environment and includes a memory in which object classes can be stored, the framework including a Sales Order mechanism comprising a Sales Order category of cooperating objects that identify one or more sales orders and a Purchase Order category of cooperating objects that identify one or more purchase orders.

12. A framework as defined in claim 11, wherein:
    each Sales Order object references object classes that identify products that are the subject of the sales order and identifies pricing and discounts applicable to the products; and
    each Purchase Order object references object classes that identify products that are the subject of the purchase order and identify pricing and discounts applicable to the products.

13. A framework as defined in claim 12, wherein the Sales Order mechanism further includes a Sales Contract Analysis Manager class object that selects Sales Contract class objects that specify contracts between the Company and customers for customer purchase of products and analyzes the selected Sales Contracts.

14. A framework as defined in claim 13, wherein the Sales Order mechanism further includes a Sales Contract Analysis Manager class object that selects Sales Contract class objects that specify contracts between the Company and customers for customer purchase of products and analyzes the selected Sales Contracts.

15. A framework as defined in claim 14, wherein the Sales Order mechanism further includes a Sales Price and Discount Requestor class object that determines Sales Contract product pricing and discounts.

16. A framework as defined in claim 12, wherein the Purchase Order mechanism further includes a Purchase Price and Discount Requestor class object that:
   (a) analyzes Purchase Order class objects specifying agreements by the Company for the purchase of Products from Logistic Supplier class objects that identify suppliers of the Products; and
   (b) determines pricing and discounts of Purchase Orders for Products.

17. A framework as defined in claim 16, wherein the Purchase Order mechanism further includes a Supply Contract Retriever class object that maintains data structures relating to a Supply Contract class object that specifies a supply contract between the Company and a Logistics Supplier entity.

18. A framework as defined in claim 17, wherein the Purchase Order mechanism further includes a Supply Contract Analysis Manager class object that performs analysis on Supply Contracts concerning unfulfilled terms of the contracts.

19. A framework as defined in claim 12, wherein:
   the Sales Order mechanism further includes a Sales Order Planned Detail class object specifying that a Sales Order for a Product will be filled by first generating a Back to Back Request Detail class object for the Product, such that the Back to Back Request Detail species either a Purchase Order for the Product, or a Stock Movement class object identifying the Product in current inventory, or a Unit of Work class object specifying a group of inventory components from which the Product will be assembled; and
   the Purchase Order mechanism includes a Back to Back Order Manager class Object that responds to the generated Back to Back Request Detail object by creating a Back to Back Order Detail class object that contains data identifying the back to back order.

20. A framework as defined in claim 19, wherein the Back to Back Order Manager class object references a Logistics Supplier class object that specifies attributes of the Back to Back Request Detail class object.

21. A program product data storage device, tangibly embodying a program of machine-readable instructions executable by a computer system having an operating system that supports an object oriented programming environment, the program product comprising:
   a recordable media; and
   a framework recorded on the recordable media, the framework including a Sales Order mechanism comprising a Sales Order category of cooperating objects that identify one or more sales orders and a Purchase Order category of cooperating objects that identify one or more purchase orders.

22. A program product as defined in claim 21, wherein:
   each Sales Order object references object classes that identify products that are the subject of the sales order and identifies pricing and discounts applicable to the products; and
   each Purchase Order object references object classes that identify products that are the subject of the purchase order and identify pricing and discounts applicable to the products.

23. A program product as defined in claim 22, wherein the Sales Order mechanism further includes a Sales Contract Analysis Manager class object that selects Sales Contract class objects that specify contracts between the Company and customers for customer purchase of products and analyzes the selected Sales Contracts.

24. A program product as defined in claim 23, wherein the Sales Order mechanism further includes a Sales Contract Analysis Manager class object that selects Sales Contract class objects that specify contracts between the Company and customers for customer purchase of products and analyzes the selected Sales Contracts.

25. A program product as defined in claim 24, wherein the Sales Order mechanism further includes a Sales Price and Discount Requestor class object that determines Sales Contract product pricing and discounts.

26. A program product as defined in claim 23, wherein the Purchase Order mechanism further includes a Purchase Price and Discount Requestor class object that:
   (a) analyzes Purchase Order class objects specifying agreements by the Company for the purchase of Products from Logistic Supplier class objects that identify suppliers of the Products; and
   (b) determines pricing and discounts of Purchase Orders for Products.

27. A program product as defined in claim 26, wherein the Purchase Order mechanism further includes a Supply Contract Retriever class object that maintains data structures relating to a Supply Contract class object that specifies a supply contract between the Company and a Logistics Supplier entity.

28. A program product as defined in claim 27, wherein the Purchase Order mechanism further includes a Supply Contract Analysis Manager class object that performs analysis on Supply Contracts concerning unfulfilled terms of the contracts.

29. A program product as defined in claim 23, wherein:
   the Sales Order mechanism further includes a Sales Order Planned Detail class object specifying that a Sales Order for a Product will be filled by first generating a Back to Back Request Detail class object for the Product, such that the Back to Back Request Detail species either a Purchase Order for the Product, or a Stock Movement class object identifying the Product in current inventory, or a Unit of Work class object specifying a group of inventory components from which the Product will be assembled; and
   the Purchase Order mechanism includes a Back to Back Order Manager class object that responds to the generated Back to Back Request Detail object by creating a Back to Back Order Detail class object that contains data identifying the back to back order.

30. A program product as defined in claim 29, wherein the Back to Back Order Manager class object references a Logistics Supplier class object that specifies attributes of the Back to Back Request Detail class object.

31. A method of distributing a program product, the method comprising the steps of:
   establishing a connection between a first computer system and a second computer system; and
   transmitting the program product from the first computer system to the second computer system, wherein the program product comprises an object oriented framework including:
      a Sales Order mechanism comprising a Sales Order category of cooperating objects that identify one or more sales orders, and a Purchase Order category of cooperating objects that identify one or more purchase orders.

32. A method as defined in claim 31, wherein:

each Sales Order object references object classes that identify products that are the subject of the sales order and identifies pricing and discounts applicable to the products; and each Purchase Order object references object classes that identify products that are the subject of the purchase order and identify pricing and discounts applicable to the products.

33. A method as defined in claim 32, wherein the Sales Order mechanism further includes a Sales Contract Analysis Manager class object that selects Sales Contract class objects that specify contracts between the Company and customers for customer purchase of products and analyzes the selected Sales Contracts.

34. A method as defined in claim 32, wherein the Sales Order mechanism further includes a Sales Price and Discount Requestor class object that determines Sales Contract product pricing and discounts.

35. A method as defined in claim 31, wherein the Purchase Order mechanism further includes a Purchase Price and Discount Requestor class object that:

(a) analyzes Purchase Order class objects specifying agreements by the Company for the purchase of Products from Logistic Supplier class objects that identify suppliers of the Products; and (b) determines pricing and discounts of Purchase Orders for Products.

36. A method as defined in claim 35, wherein the Purchase Order mechanism further includes a Supply Contract Retriever class object that maintains data structures relating to a Supply Contract class object that specifies a supply contract between the Company and a Logistics Supplier entity.

37. A method as defined in claim 31, wherein the Purchase Order mechanism further includes a Supply Contract Analysis Manager class object that performs analysis on Supply Contracts concerning unfulfilled terms of the contracts.

38. A method as defined in claim 32, wherein:

the Sales Order mechanism further includes a Sales Order Planned Detail class object specifying that a Sales Order for a Product will be filled by first generating a Back to Back Request Detail class object for the Product, such that the Back to Back Request Detail species either a Purchase Order for the Product, or a Stock Movement class object identifying the Product in current inventory, or a Unit of Work class object specifying a group of inventory components from which the Product will be assembled; and the Purchase Order mechanism includes a Back to Back Order Manager class object that responds to the generated Back to Back Request Detail object by creating a Back to Back Order Detail class object that contains data identifying the back to back order.

39. A method as defined in claim 38, wherein the Back to Back Order Manager class object references a Logistics Supplier class object that specifies attributes of the Back to Back Request Detail class object.

40. A program product as defined in claim 10, wherein:

the Order Management mechanism further includes and a Contract abstract base class specifying data structures that identify contracts between the company and business partners for supply or purchase of products;

the Sales Order mechanism further includes a SA Sales Contract category of data structures that specify Sales Contract class objects that identify contracts between the Company and customers for customer purchase of products; and the Purchase Order mechanism further includes a PU Supply Contract category of data structures that specify a Supply Contract class of objects that identify agreements between the company and a logistic supplier for purchase of supplies from the logistic supplier.

* * * * *